(12) United States Patent
Mazanec et al.

(10) Patent No.: US 9,815,740 B2
(45) Date of Patent: Nov. 14, 2017

(54) CEMENT AND CALCIUM SULFATE BASED BINDER COMPOSITION

(71) Applicant: BASF SE, Ludwigshafen (DE)

(72) Inventors: Oliver Mazanec, Rosenheim (DE); Sebastian Seufert, Tacherting (DE); Joachim Dengler, Tacherting (DE); Torben Gaedt, Traunstein (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/300,565

(22) PCT Filed: Apr. 1, 2015

(86) PCT No.: PCT/EP2015/057215
§ 371 (c)(1),
(2) Date: Sep. 29, 2016

(87) PCT Pub. No.: WO2015/150473
PCT Pub. Date: Oct. 8, 2015

(65) Prior Publication Data
US 2017/0107153 A1    Apr. 20, 2017

(30) Foreign Application Priority Data

Apr. 3, 2014 (EP) .................................. 14163427

(51) Int. Cl.
| | |
|---|---|
| *C04B 28/16* | (2006.01) |
| *C04B 28/04* | (2006.01) |
| *C04B 24/14* | (2006.01) |
| *C04B 24/26* | (2006.01) |
| *C04B 22/06* | (2006.01) |
| *C04B 103/22* | (2006.01) |
| *C04B 103/40* | (2006.01) |
| *C04B 103/14* | (2006.01) |

(52) U.S. Cl.
CPC ............ *C04B 28/16* (2013.01); *C04B 22/064* (2013.01); *C04B 24/14* (2013.01); *C04B 24/2611* (2013.01); *C04B 28/04* (2013.01); *C04B 2103/14* (2013.01); *C04B 2103/22* (2013.01); *C04B 2103/408* (2013.01)

(58) Field of Classification Search
CPC ......... C04B 28/04; C04B 28/16; C04B 24/14; C04B 22/064; C04B 24/2611; C04B 2103/14; C04B 2103/22; C04B 2103/408
See application file for complete search history.

(56) References Cited

U.S. PATENT DOCUMENTS

| | | |
|---|---|---|
| 3,451,832 A | 6/1969 | Kuntze et al. |
| 3,860,433 A | 1/1975 | Ost et al. |
| 3,885,985 A | 5/1975 | Serafin et al. |
| 3,891,454 A | 6/1975 | Cunningham et al. |
| 3,964,921 A | 6/1976 | Persinski et al. |
| 3,973,978 A | 8/1976 | Nakagawa et al. |
| 4,028,125 A | 6/1977 | Martin |
| 4,040,854 A | 8/1977 | Persinski et al. |
| 4,054,461 A | 10/1977 | Martin |
| 4,054,462 A | 10/1977 | Stude |
| 4,098,814 A | 7/1978 | Sommer et al. |
| 4,190,454 A | 2/1980 | Yamagisi et al. |
| 4,210,455 A | 7/1980 | Metcalf et al. |
| 4,286,991 A | 9/1981 | Galer et al. |
| 4,286,992 A | 9/1981 | Galer et al. |
| 4,430,469 A | 2/1984 | Bürge et al. |
| 4,661,159 A | 4/1987 | Ortega et al. |
| 4,670,055 A | 6/1987 | Koslowski et al. |
| 4,798,628 A | 1/1989 | Mills et al. |
| 5,264,470 A | 11/1993 | Eoff |
| 5,332,041 A | 7/1994 | Onan et al. |
| 5,355,954 A | 10/1994 | Onan et al. |
| 5,360,841 A | 11/1994 | Knop et al. |
| 5,398,759 A | 3/1995 | Rodrigues et al. |
| 5,413,634 A | 5/1995 | Shawl et al. |
| 5,417,759 A | 5/1995 | Huddleston |

(Continued)

FOREIGN PATENT DOCUMENTS

| | | |
|---|---|---|
| CA | 1 221 113 A | 4/1987 |
| CA | 2071051 | 12/1992 |

(Continued)

OTHER PUBLICATIONS

Matsuyama, et al., "The Formation of C—S—H/polymer complexes with superplasticizing polymers", Concrete Science and Engineering, pp. 148-156, vol. 1, Sep. 1999, Rilem Publications S.A.R.L.

Markus Arnold Dissertation, "Polymer-Controlled Crystallization of Calcium Hydroxide and Calcium Silicate Hydrate", University of Siegen, pp. 1-180, 2004. English language translation of pertinent sections (pp. 113-157, 167-168 and 177-178) are provided.

Liao et al. Effects of a carboxylic acid/sulfonic acid copolymer on the material properties of cementitious materials. Concrete Research 36 (2006) 650-655.

"Silica"; Ullmann's Encyclopedia of Industrial Chemistry; 2002; Wiley-VCH Verlag GmbH & Co. KGaA; Abstract.

Franceschini, et al., "New covalent bonded polymer-calcium silicate hydrate composites", Journal of Materials Chemistry, 2007, 17, 913-922.

(Continued)

*Primary Examiner* — Anthony J Green
(74) *Attorney, Agent, or Firm* — Curatolo Sidoti Co., LPA; Joseph G. Curatolo; Salvatore A. Sidoti

(57) ABSTRACT

The invention concerns a composition containing a) 2 to 80 weight % of Ordinary Portland Cement with respect to the total weight of the composition b) 2 to 80 weight % of a calcium sulfate based binder with respect to the total weight of the composition, with the proviso that the weight ratio of a) Ordinary Portland Cement to b) calcium sulfate based binder is from 95/5 to 5/95 and c) at least one retarder for calcium sulfate based binders, the retarder being a chemical structure, which comprises from 3 to 70 amino acids. Also concerned is the use of the compositions for self-levelling underlayments, tile adhesives, non-shrink grouts, floor screeds and repair mortars.

23 Claims, No Drawings

(56) References Cited

U.S. PATENT DOCUMENTS

| | | | |
|---|---|---|---|
| 5,481,061 A | 1/1996 | Funabashi et al. | |
| 5,567,236 A | 10/1996 | Schapira et al. | |
| 5,609,680 A | 3/1997 | Kobayashi et al. | |
| 5,685,903 A | 11/1997 | Stav et al. | |
| 5,709,743 A | 1/1998 | Leture et al. | |
| 5,716,448 A | 2/1998 | Furusawa et al. | |
| 5,925,184 A | 7/1999 | Hirata et al. | |
| 5,955,452 A | 9/1999 | Zilch et al. | |
| 6,136,797 A | 10/2000 | Zilch et al. | |
| 6,170,574 B1 | 1/2001 | Jones | |
| 6,238,474 B1 | 5/2001 | Unsin | |
| 6,346,146 B1 | 2/2002 | Duselis et al. | |
| 6,555,683 B1 | 4/2003 | Weichmann et al. | |
| 6,818,057 B2 | 11/2004 | Hanley et al. | |
| 6,832,652 B1 | 12/2004 | Dillenbeck et al. | |
| 7,041,167 B2 | 5/2006 | Jiang | |
| 7,258,736 B2 | 8/2007 | Oriakhi et al. | |
| 7,338,990 B2 | 3/2008 | Lettkeman et al. | |
| 7,605,196 B2 | 10/2009 | Schinabeck et al. | |
| 7,641,731 B2 | 1/2010 | Chanut et al. | |
| 7,772,300 B2 | 8/2010 | Schinabeck et al. | |
| 8,349,960 B2 | 1/2013 | Gaeberlein et al. | |
| 8,436,072 B2 | 5/2013 | Herth et al. | |
| 8,444,764 B2 * | 5/2013 | Winkler | C04B 40/0039 106/129.1 |
| 8,853,305 B2 * | 10/2014 | Hampel | C04B 28/02 524/5 |
| 9,045,377 B2 | 6/2015 | Nicoleau et al. | |
| 9,388,077 B2 | 7/2016 | Nicoleau et al. | |
| 2002/0129743 A1 | 9/2002 | Frailey et al. | |
| 2002/0166479 A1 | 11/2002 | Jiang | |
| 2004/0261664 A1 | 12/2004 | Oriakhi et al. | |
| 2007/0032550 A1 | 2/2007 | Lewis et al. | |
| 2007/0163470 A1 | 7/2007 | Chanut et al. | |
| 2008/0108732 A1 | 5/2008 | Wieland et al. | |
| 2008/0200590 A1 | 8/2008 | Schinabeck et al. | |
| 2008/0319217 A1 | 12/2008 | Ingrisch et al. | |
| 2009/0054558 A1 | 2/2009 | Wieland et al. | |
| 2009/0186964 A1 | 7/2009 | Schinabeck et al. | |
| 2010/0190888 A1 | 7/2010 | Gaeberlein et al. | |
| 2011/0015301 A1 | 1/2011 | Herth et al. | |
| 2011/0160393 A1 | 6/2011 | Sakamoto et al. | |
| 2011/0269875 A1 | 11/2011 | Nicoleau et al. | |
| 2012/0103609 A1 * | 5/2012 | Khatri | C04B 24/14 166/285 |
| 2012/0270969 A1 | 10/2012 | Bichler et al. | |
| 2012/0270970 A1 | 10/2012 | Bichler et al. | |
| 2013/0326985 A1 * | 12/2013 | Lichtinger | C04B 28/145 52/454 |
| 2015/0197448 A1 | 7/2015 | Nicoleau et al. | |
| 2015/0344368 A1 | 12/2015 | Hesse et al. | |

FOREIGN PATENT DOCUMENTS

| | | |
|---|---|---|
| CA | 2172004 | 9/1996 |
| CA | 2172004 A1 | 9/1996 |
| CH | 686 186 A5 | 1/1996 |
| DE | 752194 C | 5/1953 |
| DE | 35 27 981 A1 | 2/1987 |
| DE | 43 42 407 A1 | 6/1995 |
| DE | 44 11 797 A1 | 10/1995 |
| DE | 19518469 A | 11/1996 |
| DE | 197 24 700 A1 | 12/1998 |
| DE | 10 2004 050 395 A1 | 4/2006 |
| DE | 10 2005 001 101 A1 | 7/2006 |
| DE | 20 2006 016 797 U1 | 12/2006 |
| DE | 10 2005 051 375 A1 | 5/2007 |
| DE | 10 2007 027 470 A1 | 12/2008 |
| EP | 0 403 974 A1 | 12/1990 |
| EP | 0508158 A2 | 10/1992 |
| EP | 0 518 156 A2 | 12/1992 |
| EP | 0579063 A1 | 1/1994 |
| EP | 0 605 257 A1 | 7/1994 |
| EP | 0 637 574 A1 | 2/1995 |
| EP | 0785174 A1 | 7/1997 |
| EP | 0856495 A1 | 8/1998 |
| EP | 1 136 459 A1 | 9/2001 |
| EP | 1 138 697 A1 | 10/2001 |
| EP | 1 491 516 A2 | 12/2004 |
| EP | 2 108 628 A1 | 10/2009 |
| EP | 2 325 231 A1 | 5/2011 |
| GB | 1506417 A | 4/1978 |
| GB | 2240334 A | 7/1991 |
| GB | 2327417 A | 1/1999 |
| JP | 2000-095554 A | 4/2000 |
| JP | 2001-058863 A | 3/2001 |
| JP | 2001-261395 A * | 9/2001 |
| JP | 2008-127247 A | 6/2008 |
| WO | WO 02/070425 A1 | 9/2002 |
| WO | WO 2005/077857 A2 | 8/2005 |
| WO | WO 2005/090424 A1 | 9/2005 |
| WO | WO 2006/002936 A1 | 1/2006 |
| WO | WO 2006/138277 A2 | 12/2006 |
| WO | WO 2007/071361 A1 | 6/2007 |
| WO | WO 2009/103579 A1 | 8/2009 |
| WO | WO 2010/026155 A1 | 3/2010 |
| WO | WO 2011/006837 A1 | 1/2011 |
| WO | WO 2011/026720 A1 | 3/2011 |
| WO | WO 2011/026825 A2 | 3/2011 |
| WO | WO 2012/143205 A1 | 10/2012 |
| WO | WO 2012/143206 A1 | 10/2012 |
| WO | WO 2014/114782 A1 | 7/2014 |
| WO | WO 2014/114784 A1 | 7/2014 |

OTHER PUBLICATIONS

Matsuyama, et al., "Intercalation of Polymers in Calcium Silicate Hydrate: A New Synthetic Approach to Biocomposites?", Chem. Mater. 1999, 11, 16-19.

Matsuyama, et al., "Synthesis of calcium silicate hydrate/polymer complexes: Part I. Anionic and nonionic polymers", Journal of Materials Research, vol. 14, No. 8, Aug. 1999.

Matsuyama, et al., "Synthesis of calcium silicate hydrate/polymer complexes: Part II. Cationic polymers and complex formation with different polymers", Journal of Materials Research, vol. 14, No. 8, Aug. 1999.

PCT/EP2015/057215—International Search Report, dated Jul. 15, 2015.

PCT/EP2015/057215—International Written Opinion, dated Jul. 15, 2015.

R.A. Kuntze, "Retardation of the Crystallization of Calcium Sulphate Dehydrate", Nature, Jul. 23, 1966, pp. 406-407. Abstract only.

Plank, et al., "Competitive Adsorption Between Superplasticizer and Retarder Molecules on Mineral Binder Surface", Cement and Concrete Research, May 2008, pp. 599-605, vol. 38, Issue 5. Abstract only.

Plank, et al., "Modification of the Molar Anionic Charge Density of Acetone-Formaldehyde-Sulfite Dispersant to Improve Adsorption Behavior and Effectiveness in the Presence of CaAMPS®-co-NNDMA Cement Fluid Loss Polymer", Journal of Applied Polymer Science, Feb. 15, 2009, pp. 2018-2024, vol. 111, Issue 4. Abstract only.

Reul, Von H., "Untersuchungen an Stuck- und Maschinenputzgips mit Verzögerern auf Oxy-Carbonsäure- und Eiweiβbasis," ZKG International 30, Jul. 1977, pp. 331-333, vol. 7, Wiesbaden, Germany.

* cited by examiner

CEMENT AND CALCIUM SULFATE BASED BINDER COMPOSITION

CROSS REFERENCE TO RELATED APPLICATIONS

This application is a national stage application of International Application No. PCT/EP2015/057215, filed 1 Apr. 2015, which claims priority from European Patent Application No. 14163427.9, filed 3 Apr. 2014, which applications are incorporated herein by reference.

The present invention concerns a composition containing a) 2 to 80 weight % of Ordinary Portland Cement with respect to the total weight of the composition, b) 2 to 80 weight % of a calcium sulfate based binder with respect to the total weight of the composition, with the proviso that the weight ratio of a) Ordinary Portland Cement to b) calcium sulfate based binder is from 95/5 to 5/95 and c) at least one retarder for calcium sulfate based binders, the retarder being a chemical structure, which comprises from 3 to 70 amino acids. Also concerned is the use of said compositions for self-levelling underlayments, tile adhesives, non-shrink grouts, floor screeds and repair mortars.

"R. Bayer, H. Lutz, Dry Mortars, *Ullmann's Encyclopedia of Industrial Chemistry*, 6th ed., vol. 11, Wiley-VCH, Weinheim, (2003), 83-108" gives an overview of the uses and composition of dry mortars, e.g. binders, aggregates and various additives. In particular, polymer-modified cement-containing dry mixes obtained by means of additives such as redispersible polymer powders and/or cellulose ethers are customary.

For the application in for example self-levelling underlayments (SLU) ternary binder systems containing Ordinary Portland Cement (OPC), calcium aluminate cement and calcium sulfate based binders like α-bassanite and/or β-bassanite are described in "Lamberet S., 2004, Durability of ternary binder systems based on Portland Cement, calcium aluminate cement and calcium sulfate, Thèse École polytechnique fédérale de Lausanne EPFL, n° 3151 (2005) "and" Zurbriggen, R.; Bühler, E.; Lang, J. (2006). Mixed-binder based self-levelling flooring compounds: Critical formulations—the reason for typical damages. 16. Ibausil Weimar". Dry mortars of the prior art containing said ternary binder system combine the advantages of a relatively good development of compressive strength, in particular a good early strength development (in the absence of retarders), low shrinkage and early setting. The open time, which should be reasonably long enough in order to allow placing of the construction material, is easy to adjust by conventional retarders like for example tartaric acid, citric acid or sodium gluconate. However, the use of said retarders reduces the development of early strength. A further disadvantage of the ternary binder systems of the prior art is the necessity to use calcium aluminate cement, which is a relatively expensive formulation component and therefore should be replaced for economic reasons.

Besides, the conventional retarders tartaric acid, citric acid and sodium gluconate (which are needed for the fine tuning of the open time as mentioned before) negatively influence the early strength development in the ternary system of Ordinary Portland Cement (OPC), calcium aluminate cement and calcium sulfate based binders. In the case of tartaric acid also the final compressive strength becomes less good. There seems to be an undesired interaction of said conventional retarders with dispersants, which leads to higher dosages of the dispersant needed for obtaining the target level of workability/flowability of the construction material. This is also a major economic disadvantage. It is thought that the higher dispersant dosages are due to an adsorption competition to the surface of cement grains between said group of anionic retarders and the anionic dispersants as is discussed in "Plank, J.; Winter, Ch.: Competitive adsorption between superplasticizer and retarder molecules on mineral binder surface. Cement and Concrete Research, 38 (2008), pp. 599-605". The anionic retarder molecules on the surface of the cement particles reduce the positive surface charge of the cement particles and in this way the adsorption of the anionic dispersants is less favored due to less electrostatic attraction between the dispersants and the cement particles.

Binary binder systems, which contain Ordinary Portland Cement (OPC) and calcium sulfate based binders are for example described in the U.S. Pat. No. 5,685,903 in applications for floor underlayments, floor and road patching materials and fiberboards. The construction materials contain from about 20 weight % to about 75 weight % calcium sulfate beta-hemihydrate, about 10 weight % to about 50 weight % of a cement, silica fume, pozzolanic aggregate and as a retarder a natural protein-based material.

U.S. Pat. No. 4,661,159 discloses cementitious floor underlayments including beta gypsum (45 to 55 weight %), alpha gypsum (20 to 30 weight %), Portland cement (about 20 weight %) and fly ash (about 5 weight %), in each case the weight percentages are given as values referring to the total dry weight of the composition. As retarder sodium citrate is disclosed. The compositions are said to be quick-setting, non-combustible, non-water-permeable and easy to work.

U.S. Pat. No. 7,338,990 B2 discloses a mixture for preparing a slurry that hydrates to form an exterior gypsum cement, comprising 30 to 70 weight % hydraulic cement, 30 to 70 weight % calcined gypsum and 0.05 to 2.5 weight % polycarboxylate dispersant, wherein the dispersant is based on oxyalkyleneglycol-alkyl ethers and unsaturated dicarboxylic acid derivatives. The mixtures allow improved production of molded articles due to the decreased expansion of the casted material and at the same time improved mechanical strength.

The binary binder systems of the prior art show usually a relatively good shrinkage compensation capacity, but due to the presence of substantial amounts of calcium sulfate based binders the setting of the systems is too early in order to allow a reasonable open time for placing the dry mortars. The stiffening of the dry mortars is for many applications too fast and due to this the workability is no more given to allow the craftsman to apply the dry mortars in a reasonable way. The binary binder system can be used in multiple applications, preferably in self-levelling underlayment (SLU) and floor screed applications. Also the early strength development of the binary binder systems is improvable, in particular if retarders are used.

Retarders for calcium sulfate based binders basing on reaction products of a protein hydrolysis product and at least an amino acid and mixtures of amino acids with mono-, di-, oligo- and/polycarboxylic acids are disclosed in EP 2 108 628 A1.

It was object of the present invention to propose compositions, which solve the problems of the prior art. In particular the compositions should show a sufficiently long open time, a good workability during said open time (depending on the application preferably a high spread value, no bleeding, good reworking properties), low shrinkage, fast setting and at the same time the cost-performance of the dry mortars should be improved. The setting (stiffening) of the dry mortar systems should not be too early in order to allow enough open time (from about 30 minutes to about one hour, preferably 45 minutes to one hour) for the processing of the dry mortars after addition of water. In this patent application when the technical term "setting" is used, the initial setting is meant, unless there should be other indications made. The term "good reworking properties during open time" as mentioned in the before standing text means in particular that it should be easily possible for the craftsman to correct in the fresh (not yet hardened) state undesired irregularities on the surface or any other defects of the already placed and finished construction material by for example correcting said surface with suitable equipment like for example a trowel.

The object of the invention is solved by a composition containing a) 2 to 80 weight % of Ordinary Portland Cement with respect to the total weight of the composition,
b) 2 to 80 weight % of a calcium sulfate based binder with respect to the total weight of the composition, with the proviso that the weight ratio of a) Ordinary Portland Cement to b) calcium sulfate based binder is from 95/5 to 5/95 and
c) at least one retarder for calcium sulfate based binders, the retarder being a chemical structure, which comprises from 3 to 70 amino acids.

The object is also solved by the use of the composition for self-levelling underlayments, tile adhesives, non-shrink grouts, floor screeds and repair mortars.

Preferably Ordinary Portland Cement a) is contained at 2 to 60 weight %, more preferably 3 to 40 weight % in the composition, both weight percentages are indicated with respect to the total weight of the composition. Preferably a calcium sulfate based binder b) is contained at 2 to 60 weight %, more preferably 3 to 40 weight % in the composition, both weight percentages are indicated with respect to the total weight of the composition. For practical reasons in this patent application "Ordinary Portland Cement (OPC)", shall be abbreviated as component a), "calcium sulfate based binder" shall be abbreviated as component b) and the c) "at least one retarder for calcium sulfate based binders, the retarder being a chemical structure, which comprises from 3 to 70 amino acids", shall be abbreviated as component c).

It is clear to a person skilled in the art that the proviso "the weight ratio of a) Ordinary Portland Cement to b) calcium sulfate based binder is from 95/5 to 5/95" is dominated by the fact that all weight percentages of the components of the composition have as a matter of course to sum up to 100 weight %. For example at the maximum of 80 weight % of component a) it will be not possible to put into practice a relatively low ratio of a) to b), because the total weight percentage of 100% for the composition might be exceeded by the component b). On the other side at for example the maximum of 80 weight % of component b) it will not be possible to implement a relatively high ratio of component a) to component b). In each case the composition has to add up to 100 weight % for all components of the composition contained, in particular components a), b), c) and any other components optionally contained (e. g. fillers or other additives). Such optional additives can be for example redispersible powders, defoamers and stabilizers, which will be discussed more in detail in the further specification of this invention.

Preferably the compositions contain fillers. Fillers are preferably inert materials, which do not act as binder and basically do not dissolve in water. The solubility in water is preferably below 3 g/l at 20° C. and normal pressure. Preferred fillers are limestone, quartz flower, sand, silica dust and basalt powder. Fillers can be preferably present in the composition from 1 weight % to 80 weight %, preferably from 10 weight % to 80 weight %, more preferably 30 weight % to 70 weight % with respect to the total weight of the composition.

The component c) is a chemical structure comprising from 3 to 70 amino acids, preferably from 3 to 60 amino acids, more preferably from 5 to 60 amino acids and most preferably from 10 to 50 amino acids. Preferably the component c) comprises carboxamide groups, more preferably peptide groups are the linkage between the amino acids. More preferably the component c) is a polypeptide comprising 3 to 70 amino acids, more preferably from 5 to 60 amino acids and most preferably from 10 to 50 amino acids.

Generally, the term "amino acid" means preferably any organic compound comprising amine functional groups, preferably primary amine ($-NH_2$) functional groups and carboxylic acid ($-COOH$) functional groups. Said amine and carboxylic acid ($-COOH$) groups are preferably attached in each case to an aliphatic carbon atom. Preferably the number of carboxylic acid groups in the amino acid is from 1 to 2, preferably 1. Preferably the number of amine groups in the amino acid is from 1 to 2. Preferably 1 primary amine group is contained in the amino acid. For example aromatic chemicals like 3-aminobenzoic acid, any aniline derivatives or benzoic acid derivatives would not fulfil said condition and would generally not be considered as an amino acid in the field of chemistry. It is also well known that amino acids are usually present as dipolar ions, so-called zwitter ions, but can also be present in the form of their salts, depending on the pH conditions. The component c) according to this invention can be present in its salt form, preferably as earth alkali metal salt (more preferably calcium salt) and/or alkali metal salt (more preferably sodium salt).

More preferably the term "amino acid" means an amino acid selected from the group of alpha- ($\alpha$-), beta- ($\beta$-), gamma- ($\gamma$-) or delta- ($\delta$-) amino acids and mixtures thereof. In the case of alpha- ($\alpha$-) amino acids the carboxylic acid ($-COOH$) group and the amine ($-NH_2$) group are attached to the same carbon atom. This is the group of ($\alpha$-)amino acids, which appears in natural products like for example proteins. ($\alpha$-)amino acids can be described by the general formula (I):

$$NH_2-CH(R)-COOH, \qquad (I)$$

R is H (glycine), methyl (alanine), isopropyl (valine), $-CH_2-CH_2-CH(Me)_2$ (leucine), $-CHMe-CH_2-CH_3$ (isoleucine), $-CH_2$-phenyl, (phenylalanine), -4-hydroxybenzyl, (tyrosine), $-CH_2$-phenyl (phenylalanine), $-CH_2$-(3)-indol (tryptophane), $-CH_2-OH$, (serine), $-CHMeOH$, (threonine), $-CH_2-SH$, (cysteine), $-CH_2-CH_2S-CH_3$ (methionine), $-CH_2.CONH_2$ (asparagine), $-CH_2-CH_2-CONH_2$ (glutamine), $-CH_2-COOH$ (asparagic acid).

In the case of beta- ($\beta$-) amino acids the amine ($-NH_2$) group is positioned in the $\beta$-position (compared to the carboxylic group), in the case of gamma- ($\gamma$-) amino acids in the $\gamma$-position and in the case of delta- ($\delta$-) amino acids in the $\delta$-position. The before mentioned terms are well-known to the person skilled in the art of amino acids.

The term "c) at least one retarder for calcium sulfate based binders, the retarder being a chemical structure, which comprises from 3 to 70 amino acids" means preferably that said amino acids are incorporated into the chemical structure of the retarder. On the other side, for example just a mixture of amino acids would not form a chemical structure, it would be much more an assembly of various chemical structures not fulfilling the feature "comprising 3 to 70 amino acids". Said number of 3 to 70 amino acids characterizes the chemical nature of the retarder structure. Therefore a mixture of amino acids would not fall under the claims of the present patent application.

It is possible to obtain the retarders c) for calcium sulfate based binders according to this invention by building the retarders up from amino acids in a polycondensation reaction (case c-1) or by a degradation reaction, which is preferably a hydrolysis (case c-2). In the polycondensation reaction water is set free as one of the products and in the hydrolysis reaction water is consumed as one of the educts. The term polycondensation preferably means a chemical reaction in which at least two water molecules are set free. The polycondensation reaction can take place between the same type of amino acids or different types of amino acids.

In particular the chemical structure of the retarder can be built up by a polycondensation reaction between the amino acids, in particular formation of peptide bonds (carboxamide bonds) as connecting unit between the amino acids. In this case preferably no further reaction partners, in particular no reaction partners different to amino acids are involved. Catalysts (e.g. inorganic strong acids like for example sulphuric acid) may be used in order to speed up the reaction process, but are not found in the final product. It is possible to perform such a polycondensation under increased temperature (preferably from 50 to 200° C., more preferably 80 to 120° C.) and preferably under water consuming conditions, for example removal of water by an azeotropic distillation. The molecular weight of the reaction products can be monitored and the reaction be interrupted when a suitable range of molecular weight is reached. Preferably the retarder comprises from 3 to 70 amino acids, which are linked by peptide bonds.

As a simple example this could be the reaction of two amino acids (e.g. two molecules of glycine) with a third amino acid (e.g. one molecule of alanine) under condensation of two water molecules and the formation of two peptide (carboxamide) groups. The polycondensation product would contain said three amino acids in various sequences. As a matter of course in practice a mixture of various higher condensation products with more than said three amino acids will be usually formed, depending on the reaction conditions.

Preferably the c) at least one retarder for calcium sulfate based binders, the retarder being a chemical structure, which comprises from 3 to 70 amino acids, can be obtained in a polycondensation reaction between the amino acids and a further educt of the polycondensation reaction, preferably said further educt is formaldehyde.

Preferably the polycondensation product of the case c-1) is the reaction product of the amino acids with formaldehyde and contains a repeating unit [—$NR^1$—$CH_2$—]; $R^1$ is the same or is different and is a residue selected from —$(CH_2)_n$—COOH and —$(CHR^2)$—COOH; n is the same or is different and is an integer from 1 to 5; $R^2$ is the same or is different and is selected from methyl (derived from alanine), isopropyl (derived from valine), —$CH_2$—$CH_2$—$CH(Me)_2$ (derived from leucine), —CHMe-$CH_2$—$CH_3$ (derived from isoleucine), —$CH_2$-phenyl, (derived from phenylalanine), -4-hydroxy-benzyl, (derived from tyrosine), —$CH_2$-phenyl (derived from phenylalanine), —$CH_2$-(3)-indol (derived from tryptophane), —$CH_2$—OH, (derived from serine), —CHMeOH, (derived from threonine), —$CH_2$—SH, (derived from cysteine), —$CH_2$—$CH_2$—S—$CH_3$ (derived from methionine), —$CH_2$.$CONH_2$ (derived from asparagine), —$CH_2$—$CH_2$—$CONH_2$ (derived from glutamine) and —$CH_2$—COOH (derived from asparagic acid).

Preferably the retarder component c) comprises from 3 to 70 amino acids, which are linked by methylene groups (—$CH_2$—) between the amine groups of the amino acids.

In this case the polycondensation product preferably contains repeating units of the formula [—$NR^1$—$CH_2$—]; $R^1$ is the same or is different and is preferably a residue selected from —$(CH_2)_n$—COOH and —$(CHR^2)$—COOH; n is the same or is different and is an integer from 1 to 5; $R^2$ is the same or is different and is selected from methyl (derived from alanine), isopropyl (derived from valine), —$CH_2$—$CH_2$—$CH(Me)_2$ (derived from leucine), —CHMe-$CH_2$—$CH_3$ (derived from isoleucine), —$CH_2$-phenyl, (derived from phenylalanine), -4-hydroxy-benzyl, (derived from tyrosine), —$CH_2$-phenyl (derived from phenylalanine), —$CH_2$-(3)-indol (derived from tryptophane), —$CH_2$—OH, (derived from serine), —CHMeOH, (derived from threonine), —$CH_2$—SH, (derived from cysteine), —$CH_2$—$CH_2$—S—$CH_3$ (derived from methionine), —$CH_2$.$CONH_2$ (derived from asparagine), —$CH_2$—$CH_2$—$CONH_2$ (derived from glutamine) and —$CH_2$—COOH (derived from asparagic acid).

In the repeating unit [—$NR^1$—$CH_2$—] the methylene group is introduced by the reaction of formaldehyde with the amino group of the amino acid under formation of water. The repeating unit [—$NR^1$—$CH_2$—] is characteristic for the backbone of the polycondensation product. For example in the case of n being 1 the polycondensation product would be the result of a reaction between glycine and formaldehyde, in the case of n=2 the polycondensation product would be the result of a reaction between β-alanine and formaldehyde, in the case of n=3, 4-amino butane-1-carboxylic acid would react with formaldehyde and so on. Preferably n is 3 in the case of γ-amino acids, n is 4 in the case of δ-amino acids and n is 5 in the case of □-amino acids.

The products can also be made preferably by a polycondensation reaction between the respective lactames (cyclic derivative of the amino acids) of the amino acids. For example 2-pyrrolidone, which is the lactame of γ-amino butanoic acid can be used, 2-piperidinone or ϵ-caprolactame can be also used, in each case in a reaction with formaldehyde under preferably alkaline pH conditions.

The component c) preferably contains up to 50 weight %, more preferably from 1 to 50 weight %, even more preferably from 3 to 40 weight % and most preferably from 5 to 30 weight % of structural units other than amino acids.

Preferably the structural units other than amino acids are polycarboxylic acids, polyamines and formaldehyde, more preferably are derived from polycarboxylic acids, polyamines and formaldehyde (in the form of a methylene group) or mixtures thereof. Preferably the polyamines are primary (comprising a group —$NH_2$) or secondary amines (comprising a group —NHX, X≠H), more preferably primary amines.

The term "poly" in polyamine and polycarboxylic acid means that preferably at least two amine groups, respectively at least two carboxylic acid groups are present. It is preferably the case that said polyamines and polycarboxylic acids are attached by carboxamide bonds to the component c), preferably to amino acids units contained in the component c).

Preferably the polycarboxylic acids are selected from the group of dicarboxylic acids, tricarboxylic acids and tetracarboxylic acids or mixtures thereof. Dicarboxylic acids are most preferred. It is possible to use the carboxylic acids in form of their reactive derivatives like carboxylic anhydrides, carboxylic acid halogenides and carboxylic acid esters. Preferred dicarboxylic acids and derivatives of carboxylic acids are tartaric acid, 1,3-propionic acid, succinic acid, succinic anhydride, maleic acid, maleic anhydride, fumaric acid, phthalic acid, phthalic anhydride and oxalic acid or mixtures thereof.

Citric acid, aconitic acid, and nitrilotriacetic acid, butanetricarboxylic acid and propanetricarboxylic acid are preferred tricarboxylic acids and can be used also in a mixture.

As tetracarboxylic acid are preferred butanetetracarboxylic acid, 1,2,4,5-benzene tetracarboxylic acid and 1,2,4,5-benzene tetracarboxylic acid dianhydride or mixtures thereof.

As an example of polycarboxylic acids it is also possible to use poly(meth)acrylic acid. Preferably the polycarboxylic acids are not amino acids.

Preferably the polyamines are selected from the group of diamines, more preferably primary diamines, most preferably ethylene diamine, propane diamine, octamethylene diamine, isophorone diamine, 3,3'-dimethyl-4,4'-diaminodicyclohexylmethane, neopentanediamine (2,2-Dimethyl propane-1,3-diamine), 4,9-dioxadodecane-1,12-diamine, 4,7,10-trioxatridecane-1,13-diamine and Baxxodur® ECX 210 (4,9-dioxadodecane diamine) or mixtures thereof.

Preferable are also primary triamines, like for example Jeffamine® Polyetheramine T 403 and/or Jeffamine® Polyetheramine T 5000 from the company Huntsman. Preferably the polyamines are not amino acids. As polyamines diamines, in particular primary diamines with two functional groups —$NH_2$, are preferred.

It is also possible that the component c) contains monocarboxylic acids, preferably acetic acid, propionic acid, butyric acid, valeric acid. Monocarboxylic acids are less preferred to polycarboxylic acids. Preferably no monocarboxylic acids are contained in the component c). Preferably the monocarboxylic acids are not amino acids.

It is also possible that the component c) contains monoamines, the monoamines are less preferred to polyamines. Preferably no monoamines are contained in the component c). Preferably the monoamines are not amino acids.

The use of monocarboxylic acids and monoamines allows a possibility to fine tune the degree of peptide formation as the consumption of amino groups by for example the reaction (to carboxamides) with monocarboxylic acids and/or their derivatives as prescribed in the before standing text leads to products, which lack free amino groups for further peptide bond formation. On the other side the consumption of carboxylic acid groups by for example the reaction (to carboxamides) with monoamines as prescribed in the before standing text leads to products, which lack free carboxylic acid groups for further peptide bond formation. If there are no more free amino groups and no more free carboxylic acid groups available, the reaction, in particular the peptide formation, is interrupted.

Preferred is a composition in which the c) retarder for calcium sulfate based binders is the polycondensation product of the case c-1) and contains polycarboxylic acids and polyamines, the amine groups in the polyamines being primary and/or secondary amines, in a ratio so that the sum of all carboxylic equivalents in the polycarboxylic acids to the sum of all amine equivalents in the polyamines is in the range from 1/2 to 2/1, preferably the weight ratio of the sum of said polycarboxylic acids and polyamines is up to 50 weight % of the c) retarder for calcium-sulphate based binders. More preferably the sum of all carboxylic equivalents in the polycarboxylic acids to the sum of all amine equivalents in the polyamines is in the range from 1/1.5 to 1.5/1, most preferably in the range of 1/1.2 to 1.2/1.

If the sum of all carboxylic equivalents in the polycarboxylic acids to the sum of all amine equivalents in the polyamines is preferably in the range from 1/2 to 2/1, then it is possible to obtain products with a partial replacement of the amino acids, which are effective as a retarder.

In the case c-2) the component c) is a hydrolysis product of an oligo peptide and/or polypeptide, said hydrolysis product comprising from 3 to 70 amino acids, preferably from 3 to 70 α-amino acids.

The expression "oligo peptide and/or polypeptide" means in particular that it is possible to use mixtures of oligo peptides and polypeptides as well as only oligo peptides or only polypeptides. It is preferable to use polypeptides, in particular proteins as the educt for the hydrolysis process. The protein can be for example collagen from animal sources or gelatine from animal or plant sources. The hydrolysis can be for example effected by addition of water and an acid catalyst under increased temperature, preferably in the range of 50 to 200° C., more preferably 80 to 120° C. In each case it is possible to use the same type or different types of oligo peptide(s) or the same or different types of poly peptide(s).

Oligo peptides are preferably defined as comprising 2 to 10 amino acids, more preferably 3 to 10 amino acids, most preferably 5 to 10 amino acids and are linked by peptide (carboxamide) bondings.

Poly peptides are preferably defined as comprising more than 10 amino acids, more preferably 11 to 100 amino acids and are linked by carboxamide bondings. The term polypeptide comprises proteins, which preferably comprise more than 100 amino acids.

Preferably the retarder component c) is contained in the composition at a dosage of 0.01 to 5 weight %, more preferably 0.1 to 4 weight %, most preferably 0.2 to 4 weight % with respect to the calcium sulfate based binder b). The component c) is a chemical species, which is designed especially for the retardation of the calcium sulfate based binder(s) b) and basically does not retard the hardening of Ordinary Portland Cement. Therefore its weight percentage in the composition depends in particular on the contents of the component b) and it is mainly for this reason that its dosage is given as a weight percentage of the component b). The absolute contents of the component c) as weight percent of the total composition can be simply calculated by multiplying the weight percentage of component b) [weight %] with the factor of the weight percentage of retarder c). Preferably the component c) is contained from 0.0002 weight % to 4 weight %, more preferably 0.002 weight % to 3.2 weight %, most preferably 0.004 weight % to 3.2 weight % with respect to the total weight of the composition. For example, if the component b) would be 80 weight % of the composition and the weight percentage of component c) with respect to the weight of the retarder for calcium sulfate binders b) would be 5 weight % (5.1/100), then the weight percentage of component c) with respect to the total composition would be 80 weight %·5/100 (5 weight % means actually a factor of 5/100). This would be a value of 4 weight % of component c) with respect to the total composition. The above defined factor of the weight percentage of the component c) is the respective number multiplied with 1/100.

Preferably the weight % of component c) with respect to the total composition is defined as weight % of the calcium sulfate based binder b) with respect to the total weight of the composition multiplied with the weight % of the component c) with respect to the weight of the calcium sulfate based binders b), the weight % of the component c) with respect to the weight of the calcium sulfate based binders b), being indicated as weight·1/100.

The component c) allows to retard selectively the setting of the calcium sulfate based binder b) without basically affecting the setting properties of the Ordinary Portland Cement. In this way it is possible to achieve sufficient long open time (also in the presence of by its nature relatively fast setting component b)). The setting characteristics are appropriate, not too early setting as would be to expected in the case of component b) can be avoided by the component c).

Preferable is a composition in which the molecular weight of the c) retarder for calcium sulfate based binders is from 300 g/mol to 10,000 g/mol, preferably from 500 g/mol to 7,000 g/mol, most preferably from 700 g/mol to 5,000 g/mol. Preferably the molecular weight is measured by gel perforation chromatography (GPC). The polymers were analyzed by means of size exclusion chromatography with respect to average molar mass and conversion (column combination: OH-Pak SB-G, OH-Pak SB 804 HQ and OH-Pak SB 802.5 HQ from Shodex, Japan; Eluent: 80% by volume of aqueous solution of $HCO_2NH_4$ (0.05 mol/l) and 20% by volume of acetonitrile; injection volume 100 μl; flowrate 0.5 ml/min). The calibration for determining the average molar mass was done using poly acrylic acid standards.

Preferable is a composition in which the retarder is in the case c-1) a polycondensation product comprising from 3 to 70 amino acids in the structure of the polycondensation product or the retarder being in the case c-2) a hydrolysis product of an oligo peptide and/or polypeptide, said hydrolysis product comprising from 3 to 70 amino acids, preferably from 3 to 70 α-amino acids.

Preferable is a composition in which the polycondensation product of the case c-1) has peptide bonds. More preferable is a composition in which the polycondensation product of the case c-1) has peptide bonds between the amino acids.

Preferably only amino acids are comprised in the component c). Preferably the component c) is a polypeptide.

Preferable is a composition in which the polycondensation product of the case c-1) is the reaction product of the amino acids with formaldehyde and contains a repeating unit [—$NR^1$—$CH_2$—]; $R^1$ is the same or is different and is a residue selected from —$(CH_2)_n$—COOH and —$(CHR^2)$—COOH; n is the same or is different and is an integer from 1 to 5; $R^2$ is the same or is different and is selected from methyl (derived from alanine), isopropyl (derived from valine), —$CH_2$—$CH_2$—$CH(Me)_2$ (derived from leucine), —$CHMe$-$CH_2$—$CH_3$ (derived from isoleucine), —$CH_2$-phenyl, (derived from phenylalanine), -4-hydroxy-benzyl, (derived from tyrosine), $CH_2$-phenyl (derived from phenylalanine), —$CH_2$-(3)-indol (derived from tryptophane), $CH_2$—OH, (derived from serine), —CHMeOH, (derived from threonine), $CH_2$—SH, (derived from cysteine), —$CH_2$—$CH_2$—S—$CH_3$ (derived from methionine), —$CH_2CONH_2$ (derived from asparagine), —$CH_2$—$CH_2$—$CONH_2$ (derived from glutamine) and —$CH_2$—COOH (derived from asparagic acid).

Preferable is a composition in which the b) calcium sulfate based binder is selected from the group of anhydrite, α-bassanite and β-bassanite or mixtures thereof. Preferably the calcium sulfate based binder is a-bassanite and/or β-bassanite. The calcium sulfate based binders are in particular suitable in order to minimize the shrinkage of the compositions (e.g. OPC binders systems show relatively strong shrinkage) and promote fast setting of the binder systems. In particular in view of only Ordinary Portland Cement (OPC) based systems the setting can be considerably accelerated.

Preferable is a composition in which at least one dispersant for Ordinary Portland Cement a) and calcium sulfate based binders b) is contained.

Preferable is a composition in which the dispersant for Ordinary Portland Cement a) and calcium sulfate based binders b) is a polymeric dispersant, which has anionic and/or anionogenic groups and polyether side chains, preferably the polyether side chains comprise poly alkylene glycol side chains.

Preferably the dispersant for Ordinary Portland Cement a) and calcium sulfate based binders b) is a polymeric dispersant and comprises anionic and/or anionogenic groups selected from carboxylates, carboxylic acids, phosphoric acid esters, phosphoric acid ester salts, sulphonic acids and sulphonates or mixtures thereof. Preferable are carboxylates, carboxylic acids, phosphoric acid esters and phosphoric acid ester salts or mixtures thereof, most preferable are carboxylates and/or carboxylic acid groups as anionic or anionogenic groups of the dispersant for Ordinary Portland Cement a) and calcium sulfate based binders b).

The dispersant for Ordinary Portland Cement a) and calcium sulfate based binders b) is preferably a polymeric dispersant comprising sulfonic acids and/or sulfonates and is selected from the group of lignosulfonates (LGS), melamine formaldehyde sulfonate condensates (MFS), β-naphthalene sulfonic acid condensates (BNS) and sulfonated ketone-formaldehyde-condensates.

The lignosulfonates used as polymeric sulfonated dispersants are products, which are obtained as by-products of the paper industry. Such products are described in "Ullmann's Encyclopedia of Industrial Chemistry, 5th Ed., Vol. A8, pages 586, 587". They comprise units of the strongly simplified and idealized formula

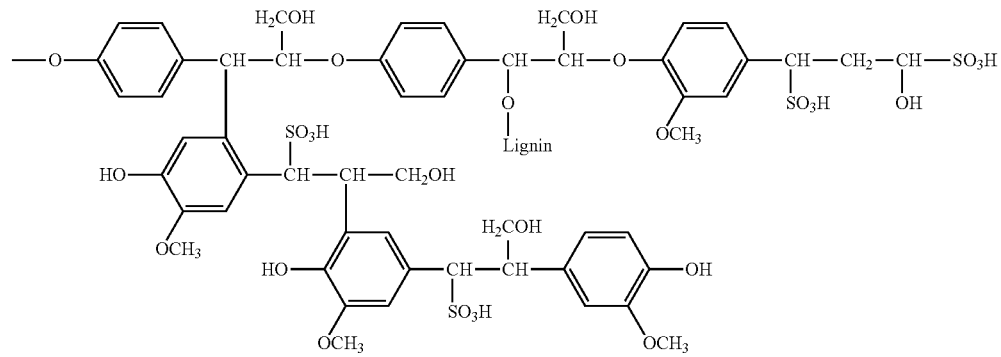

wherein n is usually 5 to 500. Lignosulfonates have usually molecular weights between 2,000 and 100,000 g/mol. Generally they are present in the form of their sodium-, calcium-, and/or magnesium salts. Examples for suitable lignosulfonates are the products marketed under the trade name Borresperse of the Norwegian company Borregaard LignoTech.

The melamine-formaldehyde-sulfonate condensates (also called MFS-resins) used as polymeric sulfonated dispersants are often used as dispersants for hydraulic binders. Melamine-formaldehyde-sulfonate condensates and their preparation are for example described in CA 2 172 004 A1, DE 44 11 797 A1, U.S. Pat. No. 4,430,469, U.S. Pat. No. 6,555,683 and CH 686 186, as well as in "Ullmann's Encyclopedia of Industrial Chemistry, 5th Ed., Vol. A2, page 131" and "Concrete Admixtures Handbook—Properties, Science and Technology, 2nd Ed., pages 411, 412". Preferred melamine-formaldehyde-sulfonate condensates comprise (strongly simplified and idealized) units of the formula

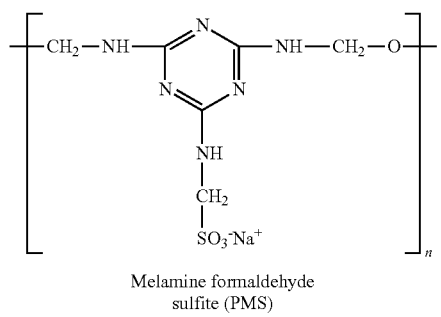

Melamine formaldehyde sulfite (PMS)

wherein n is typically a number from 10 to 300. The molecular weight is preferably in the region from 2,500 to 80,000 g/mol. An example for melamine-formaldehyde-sulfonate condensates are products marketed by the company BASF Construction Solutions GmbH under the trade name Melment®.

In addition to the sulfonated melamine units additional monomers can be co-condensated. In particular urea is suitable. Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated into the melamine-formaldehyde-sulfonate condensates.

The sulfonated ketone-formaldehyde are products in which as ketone component a mono- or diketone is used. Preferably acetone, butanone, pentanone, hexanone or cyclohexanone are built into the polymer. Such condensates are known and for example described in WO 2009/103579. Preferable are sulfonated acetone-formaldehyde-condensates. They comprise typically units of the formula (according to J. Plank et al., J. Appl. Poly. Sci. 2009, 2018-2024):

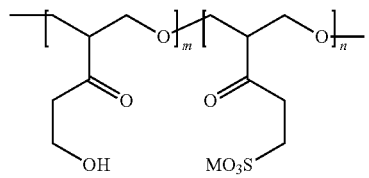

wherein m and n are typically an integer from 10 to 250, M is an alkali metall ion, for example $Na^+$, and the ratio of m:n is generally in the region from about 3:1 to about 1:3, in particular from about 1,2:1 to about 1:1,2. Examples for suitable acetone-formaldehyde-condensates are products, which are marketed by the company BASF Construction Solutions GmbH under the trade name Melcret® K1L.

Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated.

The β-naphthaline-formaldehyde-condensates (BNS) are products, which are obtained by a sulfonation of naphthaline and followed by apolycondensation with formaldehyde. Such products are described amongst others in "Concrete Admixtures Handbook—Properties, Science and Technology, 2nd Ed., pages 411-413" and "Ullmann's Encyclopedia of Industrial Chemistry, 5th Ed., Vol. A8, pages 587, 588". They comprise units of the formula

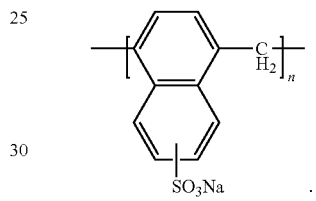

Typically the molecular weight ($M_w$) is from 1,000 to 50,000 g/mol.

Examples for suitable β-naphthaline-formaldehyde-condensates are the products marketed by the company BASF Construction Solutions GmbH under the trade name Melcret® 500 L. Furthermore aromatic building units like gallic acid, aminobenzene sulfonic acid, sulfanilic acid, phenol sulfonic acid, aniline, ammonium benzoic acid, dialkoxybenzene sulfonic acid, dialkoxybenzoic acid, pyridine, pyridine monosulfonic acid, pyridine disulfonic acid, pyridine carboxylic acid and pyridine dicarboxylic acid can be co-condensated.

Preferable is a composition characterized in that the dispersant for Ordinary Portland Cement a) and calcium sulfate based binders b) is a polymeric dispersant, which has anionic and/or anionogenic groups and polyether side chains, preferably the polyether side chains comprise poly alkylene glycol side chains. The dispersants are in this case more preferably selected from the group of polycarboxylate ethers (PCEs), the anionic group being in the case of PCEs carboxylic groups and/or carboxylate groups, and phosphorylated polycondensates. Most preferable are the polycarboxylate ethers (PCEs).

It is also possible to use mixtures of the before mentioned dispersants, for example mixtures of lignosulfonates (LGS), melamine formaldehyde sulfonate condensates (MFS), β-naphthalene sulfonic acid condensates (BNS), sulfonated keton-formaldehyde-condensates, polycarboxylate ethers (PCE) and/or phosphorylated polycondensates. The use of β-naphthalene sulfonic acid condensates (BNS) however in a mixture with polyether side chain comprising dispersants (e.g. polycarboxylate ethers (PCE) and phosphorylated polycondensates) is less preferable, because incompatibility problems between the two types of dispersants can occur.

Preferably the dispersant for inorganic binders is a copolymer, which has anionic and/or anionogenic groups and polyether side chains, preferably the polyether side chains comprise polyalkylene glycol side chains. The anionic and/or anionogenic groups and the polyether side chains are preferably attached to the backbone of the polymeric dispersant. The copolymer is preferably produced by the radical copolymerization of a polyether macromonomer and an acid monomer in a way that at least 45 mol-%, preferably at least 80 mol-% of all structural units of the copolymer were formed by copolymerization of the polyether macromonomer and the acid monomer. The term acid monomer means in particular a monomer comprising anionic and/or anionogenic groups. The term polyether macromonomer means in particular a monomer comprising at least two ether groups, preferably at least two alkylene glycol groups.

Preferable is a composition where the polymeric dispersant comprises as anionic and/or anionogenic group at least one structural unit of the general formulae (Ia), (Ib), (Ic) and/or (Id):

(Ia)

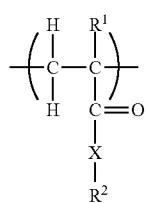

in which
R' is H or an unbranched or branched $C_1$-$C_4$ alkyl group, $CH_2COOH$ or $CH_2CO$—X—$R_3$;
X is NH—$(C_nH_{2n})$ or O—$(C_nH_{2n})$ with n=1, 2, 3 or 4, or is a chemical bond, where the nitrogen atom or the oxygen atom is bonded to the CO group;
$R^2$ is OM, $PO_3M_2$, or O—$PO_3M_2$; with the proviso that X is a chemical bond if $R^2$ is OM;
$R^3$ is $PO_3M_2$, or O—$PO_3M_2$;
(Ib)

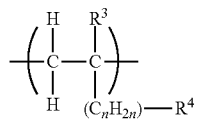

in which
$R^3$ is H or an unbranched or branched $C_1$-$C_4$ alkyl group;
n is 0, 1, 2, 3 or 4;
$R^4$ is $PO_3M_2$, or O—$PO_3M_2$;
(Ic)

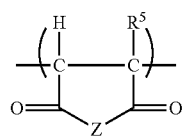

in which
$R^5$ is H or an unbranched or branched $C_1$-$C_4$ alkyl group;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and
n is 1, 2, 3 or 4;
(Id)

in which
$R^6$ is H or an unbranched or branched $C_1$-$C_4$ alkyl group;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4;
and
where each M independently of any other is H or a cation equivalent.

Preferable is a composition where the polymeric dispersant comprises as polyether side chain at least one structural unit of the general formulae (IIa), (IIb), (IIc) and/or (IId):
(IIa)

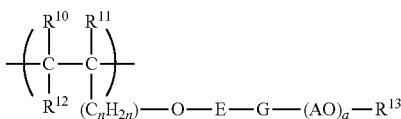

in which
$R^{10}$, $R_{11}$ and $R^{12}$ independently of one another are H or an unbranched or branched $C_1$-$C_4$ alkyl group;
E is an unbranched or branched $C_1$-$C_6$ alkylene group, a cyclohexylene group, $CH_2$—$C_6H_{10}$, 1,2-phenylene, 1,3-phenylene or 1,4-phenylene;
G is O, NH or CO—NH; or
E and G together are a chemical bond;
A is an unbranched or branched alkylene with 2 to 5 carbon atoms or $CH_2CH(C_6H_5)$;
n is 0, 1, 2, 3, 4 and/or 5;
a is an integer from 2 to 350;
$R^{13}$ is H, an unbranched or branched $C_1$-$C_4$ alkyl group, CO—$NH_2$ and/or $COCH_3$;
(IIb)

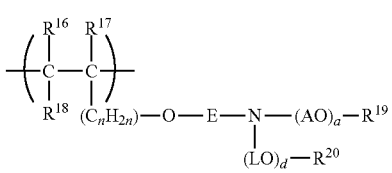

in which
R$^{16}$, R$^{17}$ and R$^{18}$ independently of one another are H or an unbranched or branched C$_1$-C$_4$ alkyl group;
E is an unbranched or branched C$_1$-C$_6$ alkylene group, a cyclohexylene group, CH$_2$—C$_6$H$_{10}$, 1,2-phenylene, 1,3-phenylene, or 1,4-phenylene, or is a chemical bond;
A is an unbranched or branched alkylene with 2 to 5 carbon atoms or CH$_2$CH(C$_6$H$_5$);
n is 0, 1, 2, 3, 4 and/or 5;
L is C$_x$H$_{2x}$ with x=2, 3, 4 or 5, or is CH$_2$CH(C$_6$H$_5$);
a is an integer from 2 to 350;
d is an integer from 1 to 350;
R$^{19}$ is H or an unbranched or branched C$_1$-C$_4$ alkyl group;
R$^{20}$ is H or an unbranched C$_1$-C$_4$ alkyl group; and
n is 0, 1, 2, 3, 4 or 5;
(IIc)

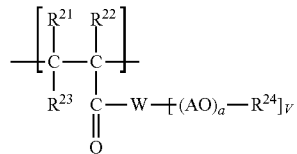
(IIc)

in which
R$^{21}$, R$^{22}$ and R$^{23}$ independently of one another are H or an unbranched or branched C$_1$-C$_4$ alkyl group;
W is O, NR$^{25}$, or is N;
V is 1 if W=O or NR$^{25}$, and is 2 if W=N;
A is an unbranched or branched alkylene with 2 to 5 carbon atoms or CH$_2$CH(C$_6$H$_5$);
a is an integer from 2 to 350;
R$^{24}$ is H or an unbranched or branched C$_1$-C$_4$ alkyl group;
R$^{25}$ is H or an unbranched or branched C$_1$-C$_4$ alkyl group;
(IId)

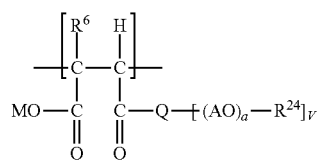
(IId)

in which
R$^6$ is H or an unbranched or branched C$_1$-C$_4$ alkyl group;
Q is NR$^{10}$, N or O;
V is 1 if W=O or NR$^{10}$ and is 2 if W=N;
R$^{10}$ is H or an unbranched or branched C$_1$-C$_4$ alkyl group;
A is an unbranched or branched alkylene with 2 to 5 carbon atoms or CH$_2$CH(C$_6$H$_5$); and
a is an integer from 2 to 350.
Preferable is a composition where the polymeric dispersant is a phosphorylated polycondensation product comprising structural units (III) and (IV):
(III)

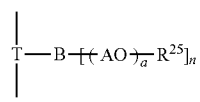
(III)

in which
T is a substituted or unsubstituted phenyl or naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is an unbranched or branched alkylene with 2 to 5 carbon atoms or CH$_2$CH(C$_5$H$_5$);
a is an integer from 1 to 300;
R$^{25}$ is H, a branched or unbranched C$_1$ to C$_{10}$ alkyl radical, C$_5$ to C$_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb):

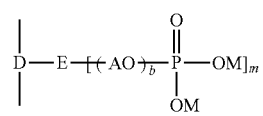
(IVa)

in which
D is a substituted or unsubstituted phenyl or naphthyl radical or a substituted or unsubstituted heteroaromatic radical having 5 to 10 ring atoms, of which 1 or 2 atoms are heteroatoms selected from N, O and S;
E is N, NH or O, with the proviso that m is 2 if E is N and with the proviso that m is 1 if E is NH or O;
A is an unbranched or branched alkylene with 2 to 5 carbon atoms or CH$_2$CH(C$_6$H$_5$);
b is an integer from 0 to 300;
M independently at each occurrence is H or a cation equivalent;

(IVb)

in which
V is a substituted or unsubstituted phenyl or naphthyl radical and is optionally substituted by 1 or two radicals selected from R$^8$, OH, ORB, (CO)R$^8$, COOM, COOR$^8$, SO$_3$R$^8$ and NO$_2$;
R$^7$ is COOM, OCH$_2$COOM, SO$_3$M or OPO$_3$M$_2$;
M is H or a cation equivalent; and
R$^8$ is C$_1$-C$_4$ alkyl, phenyl, naphthyl, phenyl-C$_1$-C$_4$ alkyl or C$_1$-C$_4$ alkylphenyl.

Preferable is a composition in which 2 to 10 weight %, preferably 3 to 8 weight %, of a calcium sulfate based binder b) are contained and the weight ratio of a) Ordinary Portland Cement to b) calcium sulfate based binder is from 90/10 to 70/30.

Binder systems with a relatively low proportion of component b) (calcium sulfate based binder) and a relatively high proportion of component a) (Ordinary Portland Cement) are used for self-levelling underlayments, tile adhesives, non-shrink grouts, floor screeds and repair mortars. Said binder systems, which contain a relatively high proportion of cement have the advantage that the shrinkage of the construction materials produced from them is reduced (in particular compared to systems without or few component b)) and higher final compressive strength values are obtained (in particular compared to systems without or few component a)). The products are less sensitive to water and show an increased durability.

Preferable is a composition in which a calcium-silicate-hydrate (C—S—H) based hardening accelerator for cementitious compositions, preferably for compositions containing Ordinary Portland Cement, is contained.

The hardening accelerator calcium-silicate-hydrate may contain foreign ions, such as magnesium and aluminium. The calcium-silicate-hydrate can be preferably described with regard to its composition by the following empirical formula:

$$a\ CaO,\ SiO_2,\ b\ Al_2O_3,\ c\ H_2O,\ d\ X,\ e\ W$$

X is an alkali metal
W is an alkaline earth metal

| | | |
|---|---|---|
| $0.1 \leq a \leq 2$ | preferably | $0.66 \leq a \leq 1.8$ |
| $0 \leq b \leq 1$ | preferably | $0 \leq b \leq 0.1$ |
| $1 \leq c \leq 6$ | preferably | $1 \leq c \leq 6.0$ |
| $0 \leq d \leq 1$ | preferably | $0 \leq d \leq 0.4$ or $0.2$ |
| $0 \leq e \leq 2$ | preferably | $0 \leq e \leq 0.1$ |

Calcium-silicate-hydrate can be obtained preferably by reaction of a calcium compound with a silicate compound, preferably in the presence of a polycarboxylate ether (PCE). Such products containing calcium-silicate-hydrate are for example described in WO 2010/026155 A1. Preferably the particle size (d(50)-value) is smaller than 5 μm, more preferably smaller than 2 μm, even more preferably smaller than 1 μm and most preferably smaller than 500 nm, the particle size being measured by light scattering with a MasterSizer® 2000 from the company Malvern.

Usually, a suspension containing the calcium-silicate-hydrate in finely dispersed form is obtained from the reaction of the calcium compound with the silicate compound. The suspension effectively accelerates the hardening process of hydraulic binders, in particular of Ordinary Portland Cement. The suspension can be dried in a conventional manner, for example by spray drying or drum drying to give a powder.

Typically the calcium-silicate-hydrate in the composition is present in the form of foshagite, hillebrandite, xonotlite, nekoite, clinotobermorite, 9 Å-tobermorite (riversiderite), 11 Å-tobermorite, 14 Å-tobermorite (plombierite), jennite, metajennite, calcium chondrodite, afwillite, α-$C_2SH$, dellaite, jaffeite, rosenhahnite, killalaite and/or suolunite. More preferably the calcium silicate hydrate in the composition, preferably aqueous hardening accelerator suspension, is xonotlite, 9 Å—tobermorite (riversiderite), 11 Å—tobermorite, 14 Å—tobermorite (plombierite), jennite, metajennite, afwillite and/or jaffeite.

In a preferred embodiment of the invention the molar ratio of calcium to silicon in the calcium-silicate-hydrate in the composition, preferably aqueous hardening accelerator suspension, is from 0.6 to 2, preferably 0.8 to 1.8, most preferably 0.9 to 1.5.

In a further preferred embodiment of the invention the molar ratio of calcium to water in the calcium-silicate-hydrate is from 0.6 to 6, preferably 0.6 to 2, more preferably 0.8 to 2. Advantage is a good acceleration effect for hydraulic binders.

Preferable is a composition, preferably dry mortar composition, in which the calcium-silicate-hydrate based hardening accelerator for cementitious compositions is a powder product. Powder products are advantageous as they are naturally high in contents of calcium-silicate-hydrate. In particular there are no compatibility problems with for example cement or other hydraulic binders, which might react with water from the aqueous calcium-silicate-hydrate containing suspension during storage.

The water content of the calcium-silicate-hydrate based hardening accelerator for cementitious compositions in powder form is preferably from 0.1 weight % to 5.5 weight % with respect to the total weight of the powder sample. Said water content is measured by putting a sample into a drying chamber at 80° C. until the weight of the sample becomes constant. The difference in weight of the sample before and after the drying treatment is the weight of water contained in the sample. The water content (%) is calculated as the weight of water contained in the sample divided with the weight of the sample.

A composition is preferred in which the calcium-silicate-hydrate based hardening accelerator for cementitious compositions is an aqueous suspension. The water content of the aqueous suspension is preferably from 10 weight % to 95 weight %, preferably from 40 weight % to 90 weight %, more preferably from 50 weight % to 85 weight %, in each case the percentage is given with respect to the total weight of the aqueous suspension sample. The water content is determined in an analogous way as described in the before standing text by use of a drying chamber.

Preferable is a composition, preferably an aqueous suspension, in which the particle size $d_{50}$ of the calcium-silicate-hydrate based hardening accelerator for cementitious compositions is smaller than 5 μm, preferably smaller than 2 μm, more preferably smaller than 1 μm and most preferably smaller than 500 nm, the particle size being measured by light scattering with a MasterSizer® 2000 from the company Malvern. Small size particles of calcium-silicate-hydrate are especially effective as hardening accelerator.

Preferable is a composition in which the calcium-silicate-hydrate based hardening accelerator for cementitious compositions was obtained in the form of a suspension by a process α) by a reaction of a water-soluble calcium compound with a water-soluble silicate compound, the reaction of the water-soluble calcium compound with the water-soluble silicate compound being carried out in the presence of an aqueous solution which contains at least one polymeric dispersant, which has anionic and/or anionogenic groups and polyether side chains, preferably poly alkylene glycol side chains, or was obtained in the form of a suspension by a process β) by reaction of a calcium compound, preferably a calcium salt, most preferably a water-soluble calcium salt, with a silicon dioxide containing component under alkaline conditions, characterized in that the reaction is carried out in the presence of an aqueous solution of at least one polymeric dispersant, which has anionic and/or anionogenic groups and polyether side chains, preferably poly alkylene glycol side chains, with the proviso that in the case of the calcium-silicate-hydrate based hydration accelerator in the composition being a powder product, the product in the form of a suspension obtained from said processes α) or β) was dried in a further step in order to obtain the powder product.

Typically the calcium compounds for the process α) and also β) are calcium salts (e.g. calcium salts of carboxylic acids). The calcium salt can be for example calcium chloride, calcium nitrate, calcium formate, calcium acetate, calcium bicarbonate, calcium bromide, calcium carbonate, calcium citrate, calcium chlorate, calcium fluoride, calcium gluconate, calcium hydroxide, calcium oxide, calcium hypochloride, calcium iodate, calcium iodide, calcium lactate, calcium nitrite, calcium oxalate, calcium phosphate, calcium propionate, calcium silicate, calcium stearate, calcium-sulphate, calcium-sulphate hemihydrate, calcium-sulphate dihydrate, calcium sulphide, calcium tartrate, calcium aluminate, tricalcium silicate and/or dicalcium silicate. Preferable are calcium hydroxide and/or calcium oxide because of their strong alkaline properties. Preferably the water-soluble calcium compound is not a calcium silicate. The silicates calcium silicate, dicalcium silicate and/or tricalcium silicate are less preferred because of low solubility (especially in the case of calcium silicate) and for economic reasons (price) (especially in case of dicalcium silicate and tricalcium silicate). Less preferable are also not so good soluble calcium salts like for example calcium carbonate and also calcium salts with retarding anions (e.g. citrate, gluconate, tartrate can retard the hardening of hydraulic binders). In the case of neutral or acid calcium salts (e.g. calcium chloride or calcium nitrate) it is preferable to use a suitable base to adjust the pH-value to alkaline conditions (e.g. lithium hydroxide, sodium hydroxide, potassium hydroxide, ammonia, magnesium hydroxide or any other earth alkali hydroxide). Preferable is a pH-value for the process higher than 8, more preferable higher than 9 and most preferable higher than 11, in particular for the process β). The pH-value is measured preferably at 25° C. and with a solid content of the suspension of 1 weight %. In the process β) calcium hydroxide is most preferable.

In the process α) the water-soluble silicate source can be selected from sodium silicate, potassium silicate, waterglass, aluminium silicate, tricalcium silicate, dicalcium silicate, calcium silicate, silicic acid, sodium metasilicate and/or potassium metasilicate.

The water-soluble silicate compound is preferably present as sodium metasilicate, potassium metasilicate and/or waterglass. Advantage of these silicate compounds is their extremely good solubility in water.

In the process β) it is possible to use any material which contains silicon dioxide, for example microsilica, pyrogenic silica, precipitated silica, blast furnace slag, and/or quartz sand. Small particle sizes of the silicon dioxide containing material are preferable, especially particle sizes below 1 μm. Further it is possible to use compounds which are able to react in an aqueous alkaline environment to silicon dioxide like for example tetraalkoxy silicon compounds of the general formula Si(OR)$_4$. R can be the same or different and can be for example selected from a branched or non-branched C1 to C10 alkyl group. Preferably R is methyl, especially preferably ethyl.

In a preferred embodiment of the process β) the silicon dioxide containing compound is selected from the group of microsilica, pyrogenic silica, precipitated silica, blast furnace slag and/or quartz sand. Preferable are microsilica, pyrogenic silica and/or precipitated silica, especially precipitated and/or pyrogenic silica. The types of silica, which are listed above are defined in Ullmann's Encyclopedia of Industrial Chemistry, Wiley-VCH, Release 2009, 7$^{th}$ Edition, DOI 10.1002/14356007.a23_583.pub3.

In the process α) more preferably a calcium salt, most preferably calcium nitrate was used as the calcium source and the silicate source was preferably sodium meta silicate. In the process β) preferably calcium hydroxide was used as the calcium source and as the silicon dioxide containing component preferably fumed silica was used. Examples for the processes α) and β) are given in the international patent application published as WO 2010/026155 A1.

In particular the addition of the calcium-silicate-hydrate based hardening accelerator increases the early strength development of the component a), which is Ordinary Portland cement (OPC).

Preferable is a composition in which the calcium-silicate-hydrate based hardening accelerator for cementitious compositions was obtained in the form of a suspension by a process α-1) in which the water-soluble calcium compound is selected from calcium hydroxide and/or calcium oxide and the water-soluble silicate compound is selected from an alkali metal silicate with the formula m SiO$_2$.n M$_2$O, wherein M is Li, Na, K or NH$_4$ or mixtures thereof, m and n are molar numbers and the ratio of m:n is from about 2.0 to 4, with the proviso that in the case of the calcium-silicate-hydrate based hydration accelerator in the composition being a powder product, the product in the form of a suspension obtained from said process α-1) was dried in a further step in order to obtain the powder product. Preferably, the water-soluble silicate compound is waterglass which may be used as aqueous solution or as powder.

Examples for the process are given in the not yet published international patent application PCT/EP 2014/051485.

Generally calcium hydroxide can also be produced from calcium hydroxide forming compounds, preferably calcium carbide can be contacted with water, which will release acetylene and calcium hydroxide.

Preferable is a composition in which the calcium-silicate-hydrate based hardening accelerator for cementitious composition is a powder product and in which before the drying step to obtain the powder product in the case a) at least one polymeric dispersant, which has anionic and/or anionogenic groups and polyether side chains, preferably polyalkyleneglycol side chains, was added to the product in the form of a suspension obtained from the process α), β) or α-1) or in the case b) at least one sulfonic acid compound of the formula (I)

in which
A$^1$ is NH$_2$, NHMe, NMe$_2$, N(CH$_2$—CH$_2$—OH)$_2$, CH$_3$, C$_2$H$_5$, CH$_2$—CH$_2$—OH, phenyl, or p-CH$_3$-phenyl, and
K$^{n+}$ is an alkali metal cation or a cation selected from the group of Ca$^{2+}$, Mg$^{2+}$, Sr$^{2+}$, Ba$^{2+}$, Zn$^{2+}$, Fe$^{2+}$, Fe$^{3+}$, Al$^{3+}$, Mn$^{2+}$ and Cu$^{2+}$ and
n is the valency of the cation; was added to the product in the form of a suspension obtained from the process α), β) or α-1). The valency of the cation means in particular its number of cationic charges, like for example if K$^{n+}$ is Mg$^{2+}$ then the valency of the magnesium ion is 2 (n=2).
Preferably A$^1$ is NH$_2$, CH$_3$ and/or phenyl. Preferably K$^{n+}$ is Ca$^{2+}$.

The term "sulfonic acid compound" is applied to all those compounds which have a structural unit —SO$_3$— in which all three oxygen atoms are linked directly to the sulfur atom. In particular, the term "sulfonic acid compound" is not confined to sulfonic acids, and also embraces the salts thereof that contain sulfonic acid anions. Preferably the sulfonic acid compound of the formula (I) are amidosulfonates ($A^1$=NH$_2$) and methylsulfonates ($A^1$=CH$_3$), more preferably methylsulfonates ($A^1$=CH$_3$).

The calcium-silicate-hydrate based hardening accelerator can be obtained in the case b) by reacting a water-soluble calcium compound (which is preferably not the calcium salt of a nonpolymeric sulfonic acid) with at least one water-soluble inorganic silicate compound in the presence of an aqueous solution of a dispersant, with addition of a water-soluble, nonpolymeric sulfonic salt. The sulfonic salt may be added preferably after the reaction. It improves the drying properties of the C—S—H suspension and allows the hardening accelerating property of the additive of the invention to be maintained even through a subsequent drying step. It thus acts as a drying aid.

In one preferred embodiment the calcium-silicate-hydrate based hardening accelerator has a molar ratio of the sulfonic acid compound present to silicon is in the range from 0.5 to 8, preferably 0.5 to 5, more particularly 1 to 5.

In the case a) the at least one polymeric dispersant, which has anionic and/or anionogenic groups and polyether side chains, preferably poly alkylene glycol side chains, serves as a drying aid added to the suspensions obtained by the processes α), β) or α-1) before drying said suspensions. Examples of the case a) are given in the international patent application published as WO 2012/143205 A1.

In the case b) the sulfonic acid compound of the formula (I) serves as a drying aid added to the suspensions obtained by the processes α), β) or α-1) before drying said suspensions. Examples of the case b) are given in the not yet published European patent application PCT/EP2014/051494.

Preferable is a composition in which the calcium-silicate-hydrate based hardening accelerator for cementitious compositions was obtained in the form of a suspension by a process γ) by reaction of a water-soluble calcium compound with a water-soluble silicate compound, characterized in that the reaction is carried out in the presence of an aqueous solution of a mixture of at least one polymeric dispersant, which has anionic and/or anionogenic groups and polyether side chains, preferably polyalkyleneglycol side chains and at least one sulfonic acid compound of the formula (I)

(I)

in which
$A^1$ is NH$_2$, NHMe, NMe$_2$, N(CH$_2$—CH$_2$—OH)$_2$, CH$_3$, C$_2$H$_5$, CH$_2$—CH$_2$—OH, phenyl, or p-CH$_3$-phenyl, and
$K^{n+}$ is an alkali metal cation or a cation selected from the group of Ca$^{2+}$, Mg$^{2+}$, Sr$^{2+}$, Ba$^{2+}$, Zn$^{2+}$, Fe$^{2+}$, Fe$^{3+}$, Al$^{3+}$, Mn$^{2+}$ and Cu$^{2+}$ and
n is the valency of the cation;
with the proviso that in the case of the calcium-silicate-hydrate based hydration accelerator in the composition being a powder product, the product in the form of a suspension obtained from said process γ) was dried in a further step in order to obtain the powder product.

In this case the calcium-silicate-hydrate containing accelerator suspensions are obtained in the presence of a dispersant and a sulfonic acid compound of the formula (I). Examples are given in the not yet published European patent application PCT/EP2014/051494.

Preferable is a composition in which the calcium-silicate-hydrate based hardening accelerator for cementitious compositions was obtained in a process δ) by reaction of a water-soluble calcium compound with a water-soluble silicate compound, characterized in that the reaction is carried out in the presence of an aqueous solution containing at least one (co)polymer having carboxylic acid groups and/or carboxylate groups and sulphonic acid groups and/or sulphonate groups, where the ratio of the number of carboxylic acid groups and/or carboxylate groups to the sulphonic acid groups and/or sulphonate groups is from 1/20 to 20/1 with the proviso that in the case of the calcium-silicate-hydrate based hydration accelerator in the composition being a powder product, the product in the form of a suspension obtained from said process δ) was dried in a further step in order to obtain the powder product.

In this case the calcium-silicate-hydrate containing suspension are preferably produced in the presence of at least one (co)polymer having carboxylic acid groups and/or carboxylate groups and sulfonic acid groups and/or sulfonate groups, where the ratio of the number of carboxylic acid groups and/or carboxylate groups to the sulfonic acid groups and/or sulfonate groups is from 1/20 to 20/1, preferably from 1/5 to 5/1, particularly preferably from 1/2 to 2/1. It is possible to dry the suspensions in a further step. Examples are given in the international patent application published as WO2012/143206 A1.

Preferably the (co)polymer having carboxylic acid groups and/or carboxylate groups and sulfonic acid groups and/or sulfonate groups has a main polymer chain of carbon atoms and the ratio of the sum of the number of carboxylic acid groups and/or carboxylate groups and sulfonic acid groups and/or sulfonate groups to the number of carbon atoms in the main polymer chain is in the range from 0.1 to 0.6, preferably from 0.2 to 0.55. Preferably said (co)polymer can be obtained from a free-radical (co)polymerisation and the carboxylic acid groups and/or carboxylate groups are derived from monocarboxylic acid monomers. Preferred is a (co)polymer, which can be obtained from a free-radical (co)polymerisation and the carboxylic acid groups and/or carboxylate groups are derived from the monomers acrylic acid and/or methacrylic acid and the sulfonic acid groups and/or sulfonate groups are derived from 2-acrylamido-2-methylpropanesulfonic acid. Preferably the weight average molecular weight $M_w$ of the (co)polymer(s) is from 8 000 g/mol to 200 000 g/mol, preferably from 10 000 to 50 000 g/mol. The weight ratio of the (co)polymer or (co)polymers to the calcium silicate hydrate is preferably from 1/100 to 4/1, more preferably from 1/10 to 2/1, most preferably from 1/5 to 1/1.

In the processes β), α-1) and γ) polymeric dispersants, which have anionic and/or anionogenic groups and polyether side chains are used. Said polymeric dispersants are preferably the same as described in detail in the before standing text of this patent application.

Preferable is a composition, which contains at least one of the additives selected from the group of redispersible powders, defoamers and stabilizers or mixtures thereof.

Preferably the redispersible polymer powder can be present as vinyl acetate polymer, vinyl acetate-ethylene copolymer, vinyl acetate-vinyl ester copolymer and/or vinyl acetate-vinyl ester-ethylene copolymer, with the vinyl ester monomers in each case being selected from the group consisting of vinyl laurate, vinyl pivalate and vinyl versatates, also as vinyl acetate-acrylic ester copolymer, vinyl acetate-acrylic ester-ethylene copolymer, styrene-butadiene copolymer and styrene-acrylic ester copolymer, with the acrylic esters in each case being esters with branched or unbranched alcohols having from 1 to 10 carbon atoms.

The term redispersible polymer powders refers to (co)polymers which can be obtained as a water-based dispersion by appropriate polymerization processes such as emulsion polymerization processes and are converted into a polymer powder in a further step by suitable drying measures such as spray drying. When mixed into water or aqueous systems, the redispersible polymer powder once again forms a water-based dispersion, hence the term redispersible polymer powder. The use of redispersible dispersion powders in aqueous building material mixtures allows important product properties, in particular properties which are important in the cured state, for example abrasion resistance, scratch resistance, tensile strength in bending and surface adhesion to various substrates, to be improved. Redispersible polymer powders are known to act essentially as organic binders in the building material mixture which has been made up with water, with this effect being based mainly on formation of a polymer film from the primary particles as a result of evaporation of water.

Suitable (co)polymers include those based on one or more ethylenically unsaturated monomers which can be selected from among one or more of the following monomer groups: vinylaromatics, vinyl esters of branched or unbranched alkylcarboxylic acids having from 1 to 15 carbon atoms, dienes, (meth)acrylic esters of branched or unbranched alcohols having from 1 to 10 carbon atoms, vinyl halides and olefins. The monomers should preferably have a hydrophobic character.

Examples of preferred monomers within the group of vinylaromatics are styrene, vinyltoluene and a-methylstyrene. As preferred vinyl esters of branched or unbranched alkylcarboxylic acids having from 1 to 15 carbon atoms, mention may be made of vinyl acetate, vinyl propionate, vinyl butyrate, vinyl 2-ethylhexanoate, 1-methylvinyl acetate, vinyl laurate and vinyl esters of monocarboxylic acids which have a tertiary carbon atom in the α position relative to the acid group and have from 5 to 11 carbon atoms (vinyl versatates), for example VeoVa5® (vinyl pivalate), VeoVa9®, VeoVa10® and VeoVa11® (trade names of Shell), with vinyl acetate and the abovementioned vinyl versatates being particularly preferred. Preferred dienes are 1,3-butadiene and isoprene, and preferred (meth)acrylic esters of branched or unbranched alcohols having from 1 to 10 carbon atoms are methyl (meth)acrylate, ethyl (meth)acrylate, propyl (meth)acrylate, n-butyl (meth)acrylate, and 2-ethyl acrylate. Preferred olefins are ethylene, propylene, 1-butene and 2-methylpropene, particularly preferably ethylene. Preferred vinyl halide monomers are vinyl chloride and vinylidene chloride.

As (co)polymers suitable as redispersible polymer powders, preference is given to the following types, with the figures for the respective monomers being % by weight based on the (co)polymer and, if appropriate together with further monomer units, adding up to 100% by weight:

From the group of polymers of vinyl alkylcarboxylates, preference is given to vinyl acetate polymers which may be partially hydrolysed; vinyl acetate-ethylene copolymers having an ethylene content of from 1 to 60% by weight; vinyl acetate copolymers with from 1 to 50% by weight of one or more, further vinyl ester monomers such as vinyl laurate, vinyl pivalate and in particular VeoVa9®, VeoVa10® and VeoVa11® (trade names of Shell), with these copolymers being able to contain from 1 to 40% by weight of ethylene as further monomer; vinyl ester-ethylene-vinyl chloride copolymers having an ethylene content of from 1 to 40% by weight and a vinyl chloride content of from 20 to 90% by weight (possible vinyl esters are, for example, vinyl acetate, vinyl propionate, vinyl butyrate, vinyl 2-ethylhexanoate, 1-methylvinyl acetate, vinyl laurate and vinyl esters of monocarboxylic acids which have a tertiary carbon atom in the alpha position relative to the acid group and have from 5 to 11 carbon atoms (vinyl versatates), for example VeoVa5® (vinyl pivalate), VeoVa9®, VeoVa10® and VeoVa11® (trade names of Shell)); vinyl acetate-acrylic ester copolymers which contain from 1 to 60% by weight of acrylic ester, preferably n-butyl acrylate, and may additionally contain from 1 to 40% by weight of ethylene.

Among the group of (meth)acrylic ester polymers, preference is given to copolymers composed of the monomer units n-butyl acrylate and/or 2-ethylhexyl acrylate; copolymers of methyl methacrylate with n-butyl acrylate and/or 2-ethylhexyl acrylate and copolymers of methyl methacrylate with 1,3-butadiene.

Among the group of vinyl halide copolymers, preference is given to the abovementioned vinyl ester-ethylene-vinyl chloride copolymers and also vinyl chloride-ethylene copolymers and vinyl chloride-acrylate copolymers.

Among the group of vinylaromatic copolymers, preference is given to styrene-butadiene copolymers and styrene-acrylic ester copolymers such as styrene-n-butyl acrylate or styrene-2-ethylhexyl acrylate having a styrene content of in each case from 10 to 70% by weight. In a further embodiment, particular preference is given to vinyl acetate polymers, vinyl acetate-ethylene copolymers having an ethylene content of from 1 to 60% by weight, vinyl acetate copolymers with from 1 to 50% by weight of one or more, further vinyl ester monomers such as vinyl laurate, vinyl pivalate and in particular vinyl versatates such as VeoVa9®, VeoVa10® and VeoVa11® (trade names of Shell), with these copolymers additionally being able to contain from 1 to 40% by weight of ethylene as further monomer. Particular preference is also given to vinyl acetate-acrylic ester copolymers which contain from 1 to 60% by weight of acrylic ester, preferably n-butyl acrylate, and may additionally contain from 1 to 40% by weight of ethylene. Particular preference is also given to styrene-butadiene copolymers and styrene-acrylic ester copolymers such as styrene-n-butyl acrylate or styrene-2-ethylhexyl acrylate having a styrene content of in each case from 10 to 70% by weight.

The redispersible polymer powder b) is very particularly preferably present as vinyl acetate polymer, vinyl acetate-ethylene copolymer, vinyl acetate-vinyl ester copolymer and/or vinyl acetate-vinyl ester-ethylene copolymer, with the vinyl ester monomers being selected in each case from the group consisting of vinyl laurate, vinyl pivalate and vinyl versatates, also as vinyl acetate-acrylic ester copolymer, vinyl acetate-acrylic ester-ethylene copolymer, styrene-butadiene copolymer and styrene-acrylic ester copolymer, with the acrylic esters in each case being esters of branched or unbranched alcohols having from 1 to 10 carbon atoms.

If appropriate, the (co)polymers can additionally contain functional comonomer units in an amount of from 0.1 to 10% by weight, based on the total weight of the polymer. These functional copolymer units can be selected from the group consisting of monocarboxylic or dicarboxylic acids, for example (meth)acrylic acid and/or maleic acid; the group consisting of ethylenically unsaturated carboxamides such as (meth)acrylamide; from the group consisting of ethylenically unsaturated sulfonic acids and salts thereof, preferably vinylsulfonic acid and/or styrenesulfonic acid; from the group consisting of multiply ethylenically unsaturated comonomers, for example divinyl adipate, triallyl isocyanurate, diallyl maleate and/or allyl methacrylate. The proportion of structural units containing a (meth)acrylamido group in the redispersible polymer powders of the general formula (II) is preferably less than 25 mol %. The (co)polymerization is carried out by processes well known in the industry, e.g. the emulsion polymerization process. The dispersions obtained can be stabilized either by means of an emulsifier or by means of a protective colloid such as polyvinyl alcohol. To obtain the redispersible polymer powders, drying is carried out, usually by conventional processes such as spray drying, freeze drying, coagulation of the dispersion and subsequent fluidized-bed drying. The preferred process is spray drying. The redispersible polymer powders are preferably present in the composition in an amount of 0.5 to 5 weight %, preferably 1 to 4 weight %, with respect to the total weight of the composition.

Preferably the defoamers are selected from the group of silicones, tributyl phosphate (TBP), copolymers of alkylenoxides wherein the alkylene is selected from the group of C2 to C18 alkylenes and mixtures thereof with the proviso that more than 20 weight % of the alkylene is one or are several alkylenes selected from the group of C3 to C16 alkylenes. The preferable dosage of the defoamers is from 0.5 to 5 weight % with respect to the weight of the total composition.

Preferably the stabilizers are polymers selected from the group of polysaccharide derivatives and/or (co)polymers with an average molecular weight $M_w$ higher than 500,000 g/mol, more preferably higher than 1,000,000 g/mol, the (co)polymers containing structural units derived (preferably by free radical polymerization) from non-ionic (meth)acrylamide monomer derivatives and/or sulfonic acid monomer derivatives. As polysaccharide derivative preference is given to cellulose ethers, for example alkylcelluloses such as methylcellulose, ethylcellulose, propylcellulose and methylethylcellulose, hydroxyalkylcelluloses such as hydroxyethylcellulose (HEC), hydroxypropylcellulose (HPC) and hydroxyethylhydroxypropylcellulose, alkylhydroxyalkylcelluloses such as methylhydroxyethylcelluose (MHEC), methylhydroxypropylcelluose (MHPC) and propylhydroxypropylcellulose. Preference is given to the cellulose ether derivatives methylcellulose (MC), hydroxypropylcellulose (HPC), hydroxyethylcellulose (HEC) and ethylhydroxyethylcellulose (EHEC), and particular preference is given to methylhydroxyethylcelluose (MHEC) and methylhydroxypropylcelluose (MHPC). The abovementioned cellulose ether derivatives, which can in each case be obtained by appropriate alkylation or alkoxylation of cellulose, are preferably present as non ionic structures, however it would be possible to use for example also carboxymethylcellulose (CMC). In addition, preference is also given to using non ionic starch ether derivatives such as hydroxypropylstarch, hydroxyethylstarch and methylhydroxypropylstarch. Preference is given to hydroxypropylstarch. Preferable are also microbially produced polysaccharides such as welan gum and/or xanthans and naturally occurring polysaccharides such as alginates, carregeenans and galactomannans. These can be obtained from appropriate natural products by extractive processes, for example in the case of alginates and carregeenans from algae, in the case of galactomannans from carob seeds.

The preferable dosage of the stabilizers is from 0.01 to 0.3, preferably 0.05 to 0.15 weight % with respect to the weight of the total composition.

Preferable is a composition in which is contained up to 30 weight % with respect to the total weight of the composition of supplementary cementitious materials selected from the group of fly ash, silica fume and blast furnace slag or mixtures thereof. More preferably is a composition in which is contained up to 20 weight %, most preferably up to 10 weight %, with respect to the total weight of the composition of supplementary cementitious materials selected from the group of fly ash, silica fume and blast furnace slag or mixtures thereof.

As a matter of course due to the fact that the weight percentages of the composition must add up to 100 weight %, it is clear that for example the weight percentages of a), b), c) and all other components contained in the composition must be sufficiently low when supplementary cementitious materials are present.

The invention also concerns the use of the composition according to this invention for self-levelling underlayments, tile adhesives, non-shrink grouts, floor screeds and repair mortars. Also industrial flooring applications are concerned. Preferably the compositions according to this invention are used for shrinkage reduction, for improving the open time, for improving the early strength development and are used for improving the setting time. The use is more preferably for shrinkage reduction, for improving the open time, for improving the early strength development and for improving the setting time of self-levelling underlayments, tile adhesives, non-shrink grouts, floor screeds and repair mortars.

EXAMPLES

1. Preparation of Binder Compositions for SLU

Self-levelling underlayments (SLU) are commonly applied on floor screeds in order to level uneven, rough surfaces. The mortar levels itself under the influence of gravity and produces a plain smooth surface.

Table 1 shows the composition of the SLU mixes according to this invention (E1 to E10) and the reference examples (R1 to R4). Details of the materials used and the test conditions used are summarized in the following description.

The samples according to this invention E1 to E10 differ in the contents of component a) (OPC), component b) (calcium sulfate based binder b)) and component c). The examples E4, E6, E8 and E10 contain also a calcium-silicate-hydrate based hardening accelerator for cementitious compositions at various dosages.

Typically, the binder system for such a mortar is based on Ordinary Portland Cement (OPC). If fast setting and high early strength development are required, a rapid hardening mortar containing OPC, Calcium Aluminate Cement (CAC) and calcium sulfate is used in the state of the art. The complete formulation of such a ternary mortar binder system is shown in table 1 (reference example R1). Rapid set and hardening of this ternary binder system is caused by massive ettringite formation. The mixing water is bound chemically in the ettringite crystals, resulting in much faster drying. Ettringite also provides good shrinkage compensation. However, Calcium Aluminate Cement (CAC) is a relatively expensive formulation compound and formulations with said cement type cannot be used in outdoor applications as humidity has a negative effect on the durability of the hardened building products. Also it is possible to obtain higher compressive strength values at 28 days for the formulations with OPC in comparison to CAC based formulations.

Reference example R2 lacks a calcium sulfate based binder b) and also component c), reference example R3 does not contain the retarder for calcium sulfate based binders (component c)).

The cement used in this study is an Ordinary Portland Cement (OPC) equivalent to EN 197-1:2011 Type I cement (available from Heidelberger Cement). Its Blaine specific surface is 3400±100 cm$^2$/g.

A Calcium Aluminate Cement from Kerneos (Ciment Fondu) combined with alpha-bassanite from Knauf (plant "Schwarze Pumpe") was used as binder for the reference SLU mix R1. Fine lime stone powder from Omyacarb, type AL 15 with a $N_2$-BET surface of 1.154 m$^2$/g and a mean particle diameter of 7.94 μm and fine quartz sand from the producer Quarzwerke Frechen with a maximum grain size of 0.5 mm were added as filler to the SLU mixes. Commercial trisodium citrate dihydrate from Jungbunzlauer was used for the reference SLU mix (R1) to retard the binder hydration and to allow a sufficient workability time.

As superplasticizer Melflux® 4930 F available from BASF Construction Solutions GmbH, was used. This superplasticizer is based on a comb copolymer with a carboxylate backbone and polyether side chains. The polycarboxylate possesses a molecular mass ($M_w$) of 26,000 g/mol and a polydispersity index of 1.45 (GPC analysis). The amount of superplasticizer was adjusted to provide an initial spread of 15±0.5 cm.

Every SLU mix contains a redipersible powder made from vinylacetate-ethylene copolymer (Wacker Vinnapas® 5023 L), a powder defoamer based on fatty alcohol alkoxylates and polysiloxanes on an inorganic carrier (BASF Vinapor® DF 9010 F) and a powder based high molecular weight synthetic polymer (BASF Starvis® 3003 F) for stabilization and to avoid bleeding of the mix. BASF Starvis® 3003 F is a copolymer of acrylic acid and acrylamide. Fresh SLUs were mixed in batches of 1000 g for 7:55 min in a planetary Hobart mixer according to EN 1937:1999. The mixing procedure is shown in table 2.

TABLE 2

| mixing procedure | | |
|---|---|---|
| 0' 00" | | |
| 0' 00"-0' 20" | 20 s | add powder to water |
| 0' 20"-1' 20" | 60 s | mixing (140 rpm) |
| 1' 20"-1' 40" | 20 s | cleaning vessel and plates |
| 1' 40"-2' 40" | 60 s | mixing (285 rpm) |
| 2' 40"-7' 40" | 300 s | waiting |
| 7' 40"-7' 55" | 15 s | mixing (285 rpm) |

TABLE 1

Materials and dry mortar composition

| component | supplier | R1 (wt. %) | R2 (wt. %) | R3 (wt. %) | E1 (wt. %) | E2 (wt. %) | E3 (wt. %) | E4 (wt. %) |
|---|---|---|---|---|---|---|---|---|
| OPC (CEM I 52.5N) | HeidelbergerCement | 8.3 | 36.5 | 30.0 | 30.0 | 30.0 | 30.0 | 30.0 |
| Calciumaluminate cement | Kernoes | 23.6 | — | — | — | — | — | — |
| Calciumsulfate | Knauf | 4.6 | — | 6.5 | 6.5 | 6.5 | 6.5 | 6.5 |
| Lime stone powder | Omyacarb | 19.4 | 19.4 | 19.4 | 19.4 | 19.4 | 19.4 | 19.4 |
| Fine quartz sand | Quarzwerke Frechen | 40.8 | 41.2 | 41.2 | 41.2 | 41.2 | 41.2 | 40.6 |
| Redispersible powder | Wacker | 2.50 | 2.5 | 2.5 | 2.5 | 2.5 | 2.5 | 2.5 |
| Lithiumcarbonat $Li_2CO_3$ | | 0.10 | — | — | — | — | — | — |
| Citric acid (retarder) | Jungbunzlauer | 0.16 | — | — | — | — | — | — |
| Defoamer | BASF | 0.15 | 0.15 | 0.15 | 0.15 | 0.15 | 0.15 | 0.15 |
| Stabilizer | BASF | 0.15 | 0.10 | 0.07 | 0.07 | 0.07 | 0.07 | 0.05 |
| Melflux ® 4930 F | BASF | 0.20 | 0.20 | 0.20 | 0.20 | 0.20 | 0.20 | 0.20 |
| Comp. c)[1] | Gelita GmbH | — | — | — | 0.01 | 0.03 | 0.05 | 0.05 |
| C-S-H (accel.)[2] | | — | — | — | — | — | — | 0.61 |
| SUM of dry materials (wt. %) | | 100.0 | 100.0 | 100.0 | 100.0 | 100.0 | 100.0 | 100.0 |
| Water content (for 100 wt. % dry mortar) | | 20.0 | 19.0 | 19.0 | 19.0 | 19.0 | 19.0 | 19.0 |

| component | supplier | E5 (wt. %) | E6 (wt. %) | E7 (wt. %) | E8 (wt. %) | E9 (wt. %) | E10 (wt. %) | E11 (wt. %) |
|---|---|---|---|---|---|---|---|---|
| OPC (CEM I 52.5N) | HeidelbergerCement | 32.0 | 32.0 | 28.0 | 28.0 | 26.0 | 26.0 | 7.0 |
| Calciumaluminate cement | Kernoes | | | | | | | |
| Calciumsulfate | Knauf | 4.5 | 4.5 | 8.5 | 8.5 | 10.5 | 10.5 | 28.0 |
| Lime stone powder | Omyacarb | 19.4 | 19.4 | 19.4 | 19.4 | 19.4 | 19.4 | 19.4 |
| Fine quartz sand | Quarzwerke Frechen | 41.2 | 40.5 | 41.5 | 40.7 | 41.5 | 40.8 | 42.8 |
| Redispersible powder | Wacker | 2.5 | 2.5 | 2.5 | 2.5 | 2.5 | 2.5 | 2.5 |
| Lithiumcarbonat $Li_2CO_3$ | | — | — | — | — | — | — | — |
| Citric acid (retarder) | Jungbunzlauer | — | — | — | — | — | — | — |
| Defoamer | BASF | 0.15 | 0.15 | 0.15 | 0.15 | 0.15 | 0.15 | 0.15 |
| Stabilizer | BASF | 0.07 | 0.05 | 0.07 | 0.05 | 0.07 | 0.05 | 0.10 |

TABLE 1-continued

| Materials and dry mortar composition | | | | | | | | |
|---|---|---|---|---|---|---|---|---|
| Melflux ® 4930 F | BASF | 0.20 | 0.20 | 0.20 | 0.20 | 0.20 | 0.20 | 0.08 |
| Comp. c)[1] | Gelita GmbH | 0.03 | 0.03 | 0.05 | 0.05 | 0.05 | 0.05 | 0.02 |
| C-S-H (accel.)[2] | | — | 0.65 | — | 0.57 | — | 0.53 | — |
| SUM of dry materials (wt. %) | | 100.0 | 100.0 | 100.0 | 100.0 | 100.0 | 100.0 | 100 |
| Water content (for 100 wt. % dry mortar) | | 19.0 | 19.0 | 19.0 | 19.0 | 19.0 | 19.0 | 19.0 |

R: . . . Reference example (comparison)
E: . . . Example according to this invention
[1]The gypsum retarder is Gelita Novotec ® 500, a protein hydrolysate available from the company Gelita Deutschland GmbH.
[2]The hardening accelerator is calcium-silicate-hydrate based and produced according to the teaching of WO 2010/026155 A1, table 2, example Acc. 25 on page 41. The solid content of the C-S-H accelerator is 21.5 weight %. The value given in the table is reflecting the addition of solid of the C-S-H accelerator to the mortar mix. The water content of the C-S-H suspension is included in the total water content.

2. Testing Procedures

To characterize the performance of the self-levelling underlayment formulations, the following parameters were determined:

Flow spread values were measured according to EN 12706 at different times after preparation of SLU. These values characterize the ability of the fresh SLU to retain its fluidity over time (evolution of the spread over time).

Setting times were determined according to DIN EN 13409:2002, EN 196-3 and DIN 1168 with a setting manipulator from Toni Technik GmbH.

Flexural and compressive strength of the SLU at 1, 7 and 28 days were measured on 4·4·16 cm³ prisms according to the standard EN 196-1:2005

Dimensional shrinkage up to 28 days was measured on 4·4·16 cm³ prisms according to the standard DIN EN 13872:2004.

All measurements were done at 21° C. and 65% relative humidity. The experimental results are summarized in table 3.

TABLE 3

Testing results of different SLUs
Testing results for the SLU samples

| | Flow spread (cm) | | | | | Setting (h) | | Flexural strength (MPa) | | | Compressive strength (MPa) | | | Drying shrinkage (‰) | | |
|---|---|---|---|---|---|---|---|---|---|---|---|---|---|---|---|---|
| Mixture | 8 min | 15 min | 30 min | 45 min | 60 min | initial | final | 1 d | 7 d | 28 d | 1 d | 7 d | 28 d | 1 d | 7 d | 28 d |
| R1 | 15.5 | 15.3 | 14.9 | 13.9 | 13.3 | 2.8 | 2.9 | 3.6 | 4.6 | 8.9 | 12.1 | 19.6 | 31.5 | 0 | 0.03 | −0.32 |
| R2 | 15.0 | 14.1 | 12.6 | 11.8 | 11.6 | 9.9 | 10.3 | 2.2 | 6.9 | 10.5 | 7.0 | 41.1 | 47.8 | 0 | −0.44 | −1.28 |
| R3 | 15.2 | 14.0 | 12.6 | 3.0 | 3.0 | 1.3 | 1.4 | — | — | — | — | — | — | — | — | — |
| E1 | 15.2 | 14.6 | 14.2 | 12.5 | 10.1 | 1.5 | 1.6 | | | | | | | | | |
| E2 | 15.3 | 15.0 | 14.1 | 13.2 | 12.5 | 2.4 | 2.5 | | | | | | | | | |
| E3 | 14.9 | 14.6 | 13.8 | 13.4 | 12.2 | 3.1 | 3.2 | 2.3 | 5.1 | 7.7 | 8.3 | 23.8 | 40.2 | 0 | 0.18 | −0.04 |
| E4 | 15.2 | 14.6 | 14.0 | 13.5 | 11.6 | 3.4 | 3.5 | 3.2 | 5.3 | 7.6 | 12.3 | 25.9 | 40.0 | 0 | 0.11 | −0.18 |
| E5 | 14.8 | 14.2 | 13.2 | 11.9 | 10.6 | 6.3 | 6.3 | 2.1 | 5.4 | 8.4 | 7.8 | 25.2 | 40.1 | 0 | 0.13 | −0.27 |
| E6 | 16.0 | 15.0 | 14.1 | 13.4 | 12.9 | 6.0 | 6.1 | 3.4 | 5.6 | 7.6 | 13.6 | 27.1 | 41.3 | 0 | 0.09 | −0.27 |
| E7 | 15.1 | 14.7 | 13.6 | 12.8 | 12.4 | 3.3 | 3.3 | 2.1 | 4.9 | 7.2 | 8.0 | 23.6 | 36.7 | 0 | 0.08 | −0.21 |
| E8 | 15.5 | 15.0 | 14.1 | 13.4 | 12.8 | 3.6 | 3.7 | 3.3 | 5.1 | 7.7 | 12.5 | 25.3 | 39.6 | 0 | 0.05 | −0.27 |
| E9 | 15.3 | 14.9 | 14.1 | 13.6 | 13.4 | 3.3 | 3.3 | 2.3 | 4.9 | 7.8 | 5.4 | 23.7 | 38.7 | 0 | 0.15 | −0.13 |
| E10 | 15.9 | 15.2 | 14.8 | 13.7 | 13.7 | 3.6 | 3.7 | 3.1 | 5.2 | 8.6 | 11.8 | 26.4 | 39.3 | 0 | 0.06 | −0.32 |
| R4 | 15.8 | 15.7 | 15.4 | 14.9 | 14.3 | 1.9 | 1.9 | 2.6 | 3.5 | 7.8 | 11.5 | 16.3 | 27.7 | 0 | 0.01 | −0.16 |

1.1 Effect of Component b) (Here α-Bassanite) on the Shrinkage Reduction

In table 3 the effect of calcium sulfate addition on the dimensional shrinkage of the SLU is shown (drying shrinkage). In this set of experiments the calcium sulfate source consisted of a-bassanite. The a-bassanite was homogenized with the other formulation components of the SLU formulation in the dry state.

These results clearly show that the drying shrinkage of the SLU can be reduced by the addition of a-bassanite, the examples according to this invention should be compared with the reference example R2 (no component b contained), which shows a relatively strong shrinkage problem.

1.2 Effect of Selective Retarder for $CaSO_4$ Based Binders (Comp. c) on Setting Table 3 illustrates the effect of the addition of a-bassanite on the flow spread behavior and setting times of an SLU formulation. No retarder for calcium sulfate based binders (component c) is contained. It can be seen that the workability is less good due to lowered flow spread over time and the setting time becomes very short by the addition of α-bassanite. Please refer in particular to the reference example R3. The open time is not long enough. The lowered flow spread is thought to be due to the fast setting and stiffening of the formulation over time, especially after 45 minutes. The examples according to this invention have a long enough period of open time.

A combination of α-bassanite and the retarder (component c) in examples E1 to E10 show that the workability (flow spread) and the setting time are significantly improved, in particular versus R3. Open time is long enough.

1.3 Effect of Accelerator Calcium-Silicate-Hydrate (C—S—H) on Strength Development The examples E4, E6, E8 and E10 show especially favorable early strength development and also a reasonably long open time (setting is not too early). The 24 hours strength values in table 3 are increased compared to the reference examples and the samples E1, E2, E3, E5, E7 and E9 without C—S—H.

It was also found experimentally that the reference sample R1 with the ternary binder system of Ordinary Portland Cement, Calcium Aluminate Cement and a calcium sulfate based binder has less good compressive strength development after 28 days compared to the samples according to this invention.

As a summary it is possible to obtain good workability (also over time), a long enough open time combined with an early enough setting and relatively good shrinkage behavior by the examples according to this invention. The use of calcium-silicate-hydrate as hardening accelerator additionally increases the early strength development.

The invention claimed is:

1. Composition containing
   a) 2 to 80 weight % of Ordinary Portland Cement with respect to the total weight of the composition,
   b) 2 to 80 weight % of a calcium sulfate based binder with respect to the total weight of the composition, with the proviso that the weight ratio of a) Ordinary Portland Cement to b) calcium sulfate based binder is from 95/5 to 5/95,
   c) at least one retarder for calcium sulfate based binders, the retarder being a chemical structure, which comprises from 3 to 70 amino acids, and
   d) a calcium-silicate-hydrate based hardening accelerator for cementitious compositions.

2. Composition according to claim 1, in which the molecular weight of the c) retarder for calcium sulfate based binders is from 300 g/mol to 10,000 g/mol.

3. Composition according to claim 1, the c) retarder being c-1) a polycondensation product comprising from 3 to 70 amino acids in the structure of the polycondensation product or c-2) a hydrolysis product of an oligo peptide and/or polypeptide, said hydrolysis product comprising from 3 to 70 amino acids, optionally from 3 to 70 α-amino acids.

4. Composition according to claim 3, in which the polycondensation product of c-1) comprises peptide bonds.

5. Composition according to claim 3, in which the c) retarder for calcium sulfate based binders is the polycondensation product of c-1) and contains polycarboxylic acids and polyamines, the amine groups in the polyamines being primary and/or secondary amines, in a ratio so that the sum of all carboxylic equivalents in the polycarboxylic acids to the sum of all amine equivalents in the polyamines is in the range from 1/2 to 2/1, optionally the weight ratio of the sum of said polycarboxylic acids and polyamines is up to 50 weight % of the c) retarder for calcium sulfate based binders.

6. Composition according to claim 3, in which the polycondensation product of c-1) is the reaction product of the amino acids with formaldehyde and contains a repeating unit [—$NR^1$—$CH_2$—]; $R^1$ is the same or is different and is a residue selected from —$(CH_2)$n-COOH and —$(CHR^2)$—COOH; n is the same or is different and is an integer from 1 to 5; $R^2$ is the same or is different and is selected from methyl, isopropyl, —$CH_2$—$CH_2$—$CH(Me)_2$, —CHMe-$CH_2$—$CH_3$, —$CH_2$-phenyl, -4-hydroxy-benzyl, —$CH_2$-phenyl, —$CH_2$-(3)-indol, —$CH_2$—OH, —CHMeOH, —$CH_2$—S—H, —$CH_2$—$CH_2$—S—$CH_3$, —$CH_2$—$CONH_2$, —$CH_2$—$CH_2$—$CONH_2$ and —$CH_2$—COOH.

7. Composition according to claim 1, in which the b) calcium sulfate based binder is selected from the group of anhydrite, α-bassanite and β-bassanite or mixtures thereof.

8. Composition according to claim 1, in which at least one dispersant for Ordinary Portland Cement a) and calcium sulfate based binders b) is contained.

9. Composition according to claim 8, in which the dispersant for Ordinary Portland Cement a) and calcium sulfate based binders b) is a polymeric dispersant, which has anionic and/or anionogenic groups and polyether side chains, optionally the polyether side chains comprise poly alkylene glycol side chains.

10. Composition according to claim 9, where the polymeric dispersant comprises as anionic and/or anionogenic group at least one structural unit of the general formulae (Ia), (Ib), (Ic) and/or (Id):

(Ia)

in which
$R^1$ is H or an unbranched or branched $C_1$-$C_4$ alkyl group, $CH_2COOH$ or $CH_2CO$—X—$R^3$;
X is NH—$(C_nH_{2n})$ or O—$(C_nH_{2n})$ with n=1, 2, 3 or 4, or is a chemical bond, where the nitrogen atom or the oxygen atom is bonded to the CO group;

$R^2$ is OM, $PO_3M_2$, or $O-PO_3M_2$; with the proviso that X is a chemical bond if $R^2$ is OM;

$R^3$ is $PO_3M_2$, or $O-PO_3M_2$;

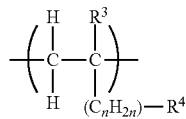

(Ib)

in which
$R^3$ is H or an unbranched or branched $C_1$-$C_4$ alkyl group;
n is 0, 1, 2, 3 or 4;
$R^4$ is $PO_3M_2$, or $O-PO_3M_2$;

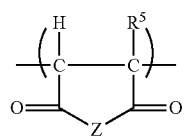

(Ic)

in which
$R^5$ is H or an unbranched or branched $C_1$-$C_4$ alkyl group;
Z is O or $NR^7$;
$R^7$ is H, $(C_nH_{2n})-OH$, $(C_nH_{2n})-PO_3M_2$, $(C_nH_{2n})-OPO_3M_2$, $(C_6H_4)-PO_3M_2$, or $(C_6H_4)-OPO_3M_2$, and n is 1, 2, 3 or 4;

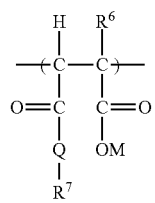

(Id)

in which
$R^6$ is H or an unbranched or branched $C_1$-$C_4$ alkyl group;
Q is $NR^7$ or O;
$R^7$ is H, $(C_nH_{2n})-OH$, $(C_nH_{2n})-PO_3M_2$, $(C_nH_{2n})-OPO_3M_2$, $(C_6H_4)-PO_3M_2$, or $(C_6H)-OPO_3M_2$,
n is, 2, 3 or 4;
and
where each M independently of any other is H or a cation equivalent.

11. Composition according to claim 9, where the polymeric dispersant comprises as polyether side chain at least one structural unit of the general formulae (IIa), (IIb), (IIc) and/or (IId):

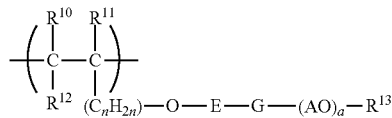

(IIa)

in which
$R^{10}$, $R^{11}$ and $R^{12}$ independently of one another are H or an unbranched or branched $C_1$-$C_4$ alkyl group;
E is an unbranched or branched $C_1$-$C_6$ alkylene group, a cyclohexylene group, $CH_2-C_6H_{10}$, 1,2-phenylene, 1,3-phenylene or 1,4-phenylene;
G is O, NH or CO—NH; or
E and G together are a chemical bond;
A is an unbranched or branched alkylene group with 2 to 5 carbon atoms or $CH_2CH(C_6H_5)$;
n is 0, 1, 2, 3, 4 or 5;
a is an integer from 2 to 350;
$R^{13}$ is H, an unbranched or branched $C_1$-$C_4$ alkyl group, $CO-NH_2$ and/or $COCH_3$;

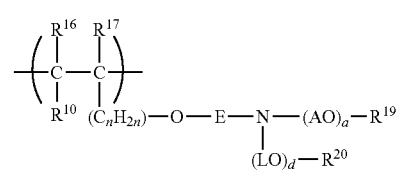

(IIb)

in which
$R^{16}$, $R^{17}$ and $R^{18}$ independently of one another are H or an unbranched or branched $C_1$-$C_4$ alkyl group;
E is an unbranched or branched $C_1$-$C_6$ alkylene group, a cyclohexylene group, $CH_2-C_6H_{10}$, 1,2-phenylene, 1,3-phenylene, or 1,4-phenylene, or is a chemical bond;
A is an unbranched or branched alkylene with 2 to 5 carbon atoms or $CH_2CH(C_6H_5)$;
n is 0, 1, 2, 3, 4 or 5;
L is $C_xH_{2x}$ with x=2, 3, 4 or 5, or is $CH_2CH(C_6H_5)$;
a is an integer from 2 to 350;
d is an integer from 1 to 350;
$R^{19}$ is H or an unbranched or branched $C_1$-$C_4$ alkyl group;
$R^{20}$ is H or an unbranched or branched $C_1$-$C_4$ alkyl group; and
n is 0, 1, 2, 3, 4 or 5;

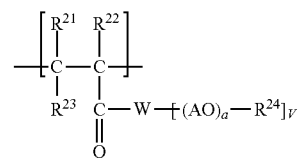

(IIc)

in which
$R^{21}$, $R^{22}$ and $R^{23}$ independently of one another are H or an unbranched or branched $C_1$-$C_4$ alkyl group;
W is O, $NR^{25}$, or is N;
V is 1 if W=O or $NR^{25}$, and is 2 if W=N;
A is an unbranched or branched alkylene with 2 to 5 carbon atoms or $CH_2CH(C_6H_5)$;
a is an integer from 2 to 350;

$R^{24}$ is H or an unbranched or branched $C_1$-$C_4$ alkyl group;
$R^{25}$ is H or an unbranched or branched $C_1$-$C_4$ alkyl group;

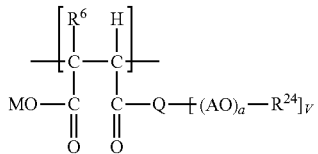
(IId)

in which
R6 is H or an unbranched or branched $C_1$-$C_4$ alkyl group;
Q is $NR^{10}$; N or O;
V is 1 if W=O or $NR^{10}$ and is 2 if W=N;
$R^{10}$ is H or an unbranched or branched $C_1$-$C_4$ alkyl group;
A is an unbranched or branched alkylene with 2 to 5 carbon atoms or $CH_2CH(C_6H_5)$; and
a is an integer from 2 to 350.

12. Composition according to claim 8, where the polymeric dispersant is a phosphorylated polycondensation product comprising structural units (III) and (IV):

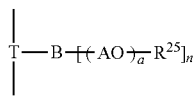
(III)

in which
T is a substituted or unsubstituted phenyl or naphthyl radical or a substituted or unsubstituted heteroaromatic radical having 5 to 10 ring atoms, of which 1 or 2 atoms are heteroatoms selected from N, O and S;
n is 1 or 2;
B is N, NH or O, with the proviso that n is 2 if B is N and with the proviso that n is 1 if B is NH or O;
A is an unbranched or branched alkylene with 2 to 5 carbon atoms or $CH_2CH(C_6H_5)$;
a is an integer from 1 to 300;
$R^{25}$ is H, a branched or unbranched $C_1$ to $C_{10}$ alkyl radical, $C_5$ to $C_8$ cycloalkyl radical, aryl radical, or heteroaryl radical having 5 to 10 ring atoms, of which 1 or 2 atoms are heteroatoms selected from N, O and S;
where the structural unit (IV) is selected from the structural units (IVa) and (IVb):

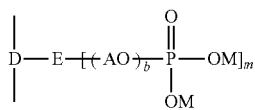
(IVa)

in which
D is a substituted or unsubstituted phenyl or naphthyl radical or a substituted or unsubstituted heteroaromatic radical having 5 to 10 ring atoms, of which 1 or 2 atoms are heteroatoms selected from N, O and S;
E is N, NH or O, with the proviso that m is 2 if E is N and with the proviso that m is 1 if E is NH or O;

A is an unbranched or branched alkylene with 2 to 5 carbon atoms or $CH_2CH(C_6H_5)$;
b is an integer from 0 to 300;
M independently at each occurrence is H or a cation equivalent;

(IVb)

in which
V is a substituted or unsubstituted phenyl or naphthyl radical and is optionally substituted by 1 or two radicals selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is H or a cation equivalent; and
$R^8$ is $C_1$-$C_4$ alkyl, phenyl, naphthyl, phenyl-$C_1$-$C_4$ alkyl or $C_1$-$C_4$ alkylphenyl.

13. Composition according to claim 1, in which 2 to 10 weight % of a calcium sulfate based binder b) are contained and the weight ratio of a) Ordinary Portland Cement to b) calcium sulfate based binder is from 90/10 to 70/30.

14. Composition according to claim 1, optionally dry mortar composition, in which the calcium-silicate-hydrate based hardening accelerator for cementitious compositions is a powder product.

15. Composition according to claim 1, in which the calcium-silicate-hydrate based hardening accelerator for cementitious compositions is an aqueous suspension.

16. Composition according to claim 15, in which the particle size $d_{50}$ of the calcium-silicate-hydrate based hardening accelerator for cementitious compositions is smaller than 5 μm, the particle size being measured by light scattering.

17. Composition according to claim 1, in which the calcium-silicate-hydrate based hardening accelerator for cementitious compositions was obtained in the form of a suspension by a
process α) by a reaction of a water-soluble calcium compound with a water-soluble silicate compound, the reaction of the water-soluble calcium compound with the water-soluble silicate compound being carried out in the presence of an aqueous solution which contains at least one polymeric dispersant, which has anionic and/or anionogenic groups and polyether side chains, optionally polyalkylene glycol side chains,
or was obtained in the form of a suspension by a
process β) by reaction of a calcium compound, optionally a calcium salt, further optionally a water-soluble calcium salt, with a silicon dioxide containing component under alkaline conditions, characterized in that the reaction is carried out in the presence of an aqueous solution of at least one polymeric dispersant, which has anionic and/or anionogenic groups and polyether side chains, optionally poly alkylene glycol side chains, with the proviso that in the case of the calcium-silicate-hydrate based hydration accelerator in the composition being a powder product, the product in the form of a suspension obtained from said processes α) or β) was dried in a further step in order to obtain the powder product.

18. Composition according to claim 17 in which the calcium-silicate-hydrate based hardening accelerator for cementitious compositions was obtained in the form of a suspension by a process α-1) in which the water-soluble calcium compound is selected from calcium hydroxide and/or calcium oxide and the water-soluble silicate compound is selected from an alkali metal silicate with the formula m SiO$_2$.nM$_2$O, wherein M is Li, Na, K or NH4 or mixtures thereof, m and n are molar numbers and the ratio of m:n is from about 2.0 to about 4 with the proviso that in the case of the calcium-silicate-hydrate based hydration accelerator in the composition being a powder product, the product in the form of a suspension obtained from said process α-1) was dried in a further step in order to obtain the powder product.

19. Composition according to claim 17 in which the calcium-silicate-hydrate based hardening accelerator for cementitious composition is a powder product and in which before the drying step to obtain the powder product (i) at least one polymeric dispersant, which has anionic and/or anionogenic groups and polyether side chains, optionally poly alkylene glycol side chains, was added to the product in the form of a suspension obtained from the process α), β) or α-1) or (ii) at least one sulfonic acid compound of the formula (I)

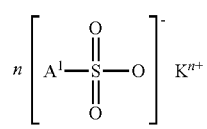

in which
A$^1$ is NH$_2$, NHMe, NMe$_2$, N(CH$_2$—CH$_2$—OH)$_2$, CH$_3$, C$_2$H$_5$, CH$_2$—CH$_2$—OH, phenyl, or p-CH$_3$-phenyl, and
K$^{n+}$ is an alkali metal cation or a cation selected from the group of Ca$^{2+}$, Mg$^{2+}$, Sr$^{2+}$, Ba$^{2+}$, Zn$^{2+}$, Fe$^{2+}$, Fe$^{3+}$, Al$^{3+}$, Mn$^{2+}$ and Cu$^{2+}$ and
n is the valency of the cation; was added to the product in the form of a suspension obtained from the process α), β), or α-1).

20. Composition according to claim 17, in which the calcium-silicate-hydrate based hardening accelerator for cementitious compositions was obtained in the form of a suspension by a process γ) by reaction of a water-soluble calcium compound with a water-soluble silicate compound, characterized in that the reaction is carried out in the presence of an aqueous solution of a mixture of at least one polymeric dispersant, which has anionic and/or anionogenic groups and polyether side chains, optionally poly alkylene glycol side chains and at least one sulfonic acid compound of the formula (I)

in which
A$^1$ is NH$_2$, NHMe, NMe$_2$, N(CH$_2$—CH$_2$—OH)$_2$, CH$_3$, C$_2$H$_5$, CH$_2$—CH$_2$—OH, phenyl, or p-CH$_3$-phenyl, and
K$^{n+}$ is an alkali metal cation or a cation selected from the group of Ca$^{2+}$, Mg$^{2+}$, Sr$^{2+}$, Ba$^{2+}$, Zn$^{2+}$, Fe$^{2+}$, Fe$^{3+}$, Al$^{3+}$, Mn$^{2+}$ and Cu$^{2+}$ and
n is the valency of the cation;
with the proviso that in the case of the calcium-silicate-hydrate based hydration accelerator in the composition being a powder product, the product in the form of a suspension obtained from said process γ) was dried in a further step in order to obtain the powder product.

21. Composition according to claim 1, in which the calcium-silicate-hydrate based hardening accelerator for cementitious compositions was obtained in a process δ) by reaction of a water-soluble calcium compound with a water-soluble silicate compound, characterized in that the reaction is carried out in the presence of an aqueous solution containing at least one (co)polymer having carboxylic acid groups and/or carboxylate groups and sulfonic acid groups and/or sulfonate groups, where the ratio of the number of carboxylic acid groups and/or carboxylate groups to the sulfonic acid groups and/or sulfonate groups is from 1/20 to 20/1 with the proviso that in the case of the calcium-silicate-hydrate based hydration accelerator in the composition being a powder product, the product in the form of a suspension obtained from said process δ) was dried in a further step in order to obtain the powder product.

22. Composition according to claim 1, which contains at least one of the additives selected from the group of redispersible powders, defoamers and stabilizers or mixtures thereof.

23. Composition according to claim 1, in which is contained up to 30 weight % with respect to the total weight of the composition of supplementary cementitious materials selected from the group of fly ash, silica fume and blast furnace slag or mixtures thereof.

* * * * *

UNITED STATES PATENT AND TRADEMARK OFFICE
CERTIFICATE OF CORRECTION

PATENT NO. : 9,815,740 B2
APPLICATION NO. : 15/300565
DATED : November 14, 2017
INVENTOR(S) : Mazanec et al.

It is certified that error appears in the above-identified patent and that said Letters Patent is hereby corrected as shown below:

In Claim 10 (Column 33, Line 50), the last definition of substituent "$R^7$" in the structural unit of general formula (Id) is incorrect. The last definition of substituent "$R^7$" in the structural unit of general formula (Id) should read "$(C_6H_4)\text{-}OPO_3M_2$".

Signed and Sealed this
Twentieth Day of February, 2018

Andrei Iancu
*Director of the United States Patent and Trademark Office*